United States Patent [19]
French

[11] 3,845,289
[45] Oct. 29, 1974

[54] METHOD AND APPARATUS EMPLOYING AUTOMATIC ROUTE CONTROL SYSTEM

[75] Inventor: Robert L. French, Fort Worth, Tex.

[73] Assignee: Avon, Inc., Fort Worth, Tex.

[22] Filed: July 18, 1972

[21] Appl. No.: 272,734

[52] U.S. Cl. .............. 235/151.2, 221/1, 235/150.2, 340/24
[51] Int. Cl. .......................................... G06f 15/50
[58] Field of Search ......... 235/150.2, 151.2, 150.24, 235/150.24; 340/21, 23, 24; 179/100.1 C; 444/1; 221/1, 13, 185

[56] References Cited
UNITED STATES PATENTS

| | | | |
|---|---|---|---|
| 2,501,048 | 3/1950 | Haller | 179/100.1 C |
| 3,653,538 | 4/1972 | Lamar | 221/13 |
| 3,681,752 | 8/1972 | Cuddihy | 340/24 |

*Primary Examiner*—Felix D. Gruber
*Attorney, Agent, or Firm*—Wofford, Felsman, Fails & Zobal

[57] ABSTRACT

Method and apparatus facilitating effecting actions along a predetermined route segment, as in commercial and residential neighborhoods, characterized by a self-contained on-board system which directs the operation of a conventional motor vehicle over the predetermined route segments, and gives instructions as to activities to be performed at closely spaced points along the route. In effect, the system continuously measures the vehicle's location coordinates, compares these with the route coordinates, and then issues audio, visual and/or printed instructions appropriate to the location. The system also detects driver errors and prescribes corrective action. The routes to be followed and the actions to be taken are defined on interchangeable magnetic tape cartridges which may be updated daily, or as required, from the computerized central file. The system enables a driver to operate efficiently over a complex route without reference to maps or lists, and without prior knowledge of the route. It also eliminates tedious manual report preparation because computer-ready data for route accounting can be acquired on a magnetic tape cartridge. Although applicable to most types of operations carried out over routes that can be defined in advance, the prototype application is for the delivery of newspapers, preferably employing manual paper throwers for safety. The system signals each thrower with a tone through earphones at the proper time to throw papers to individual subscribers while driving through residential areas at 15 to 30 miles per hour (mph).

45 Claims, 17 Drawing Figures

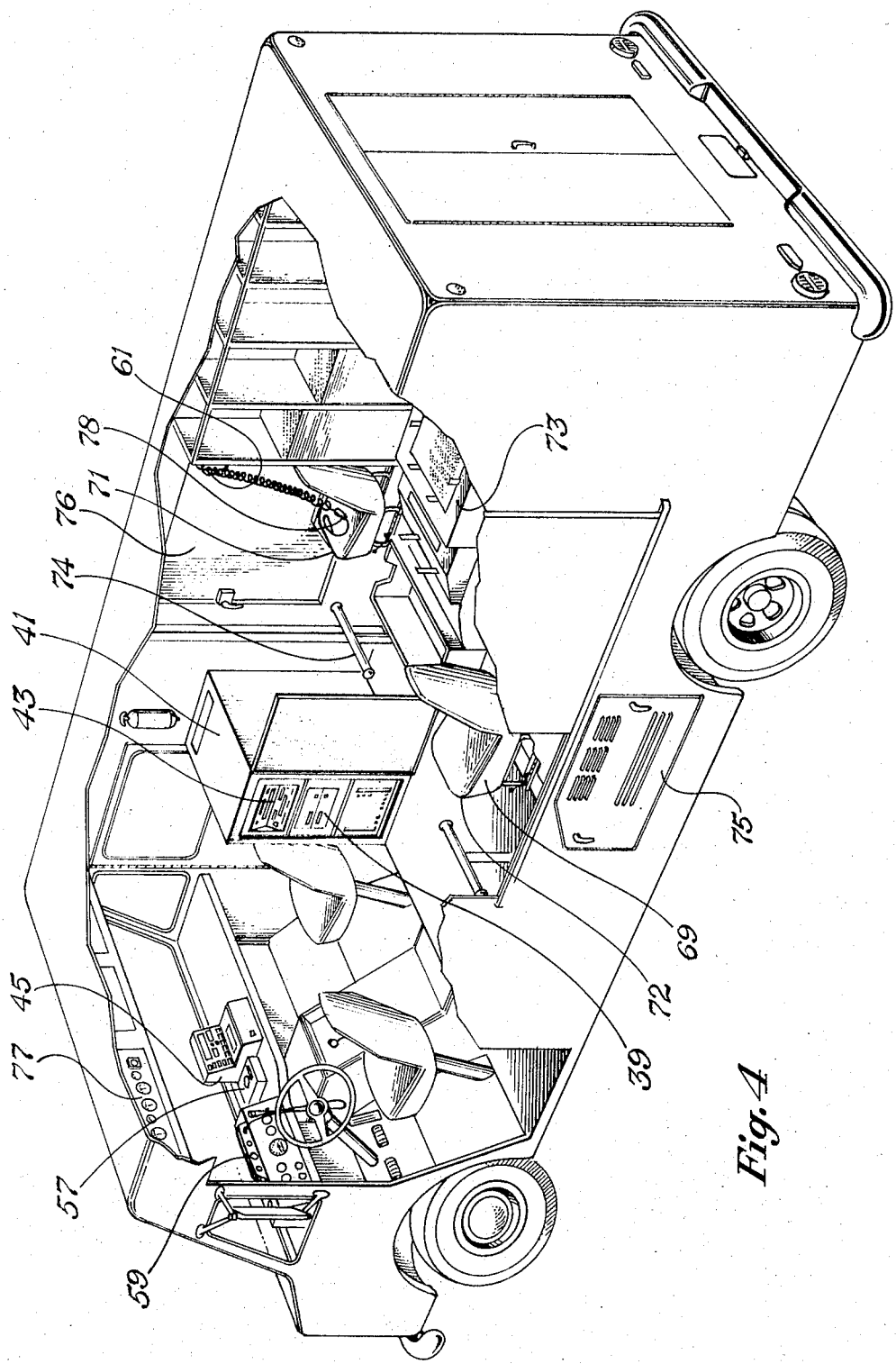

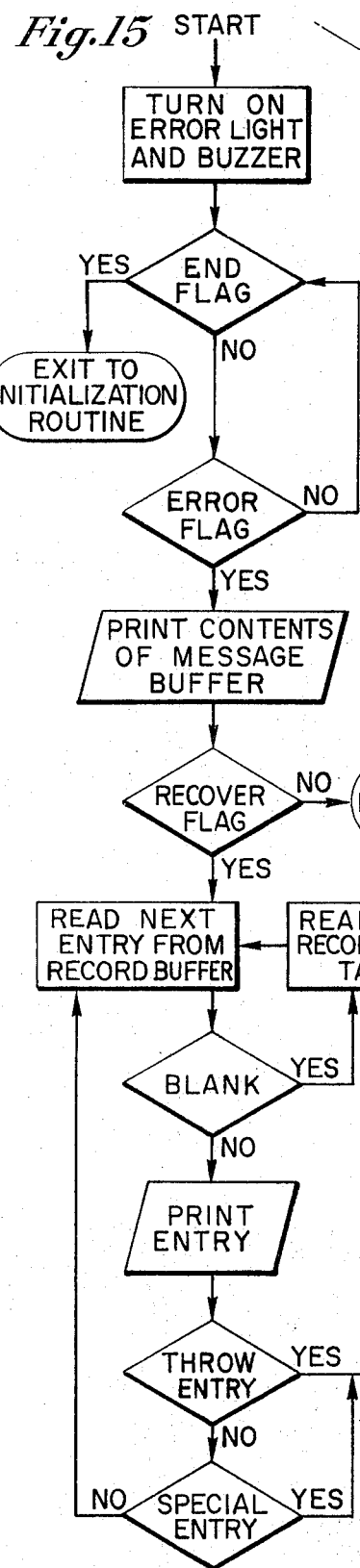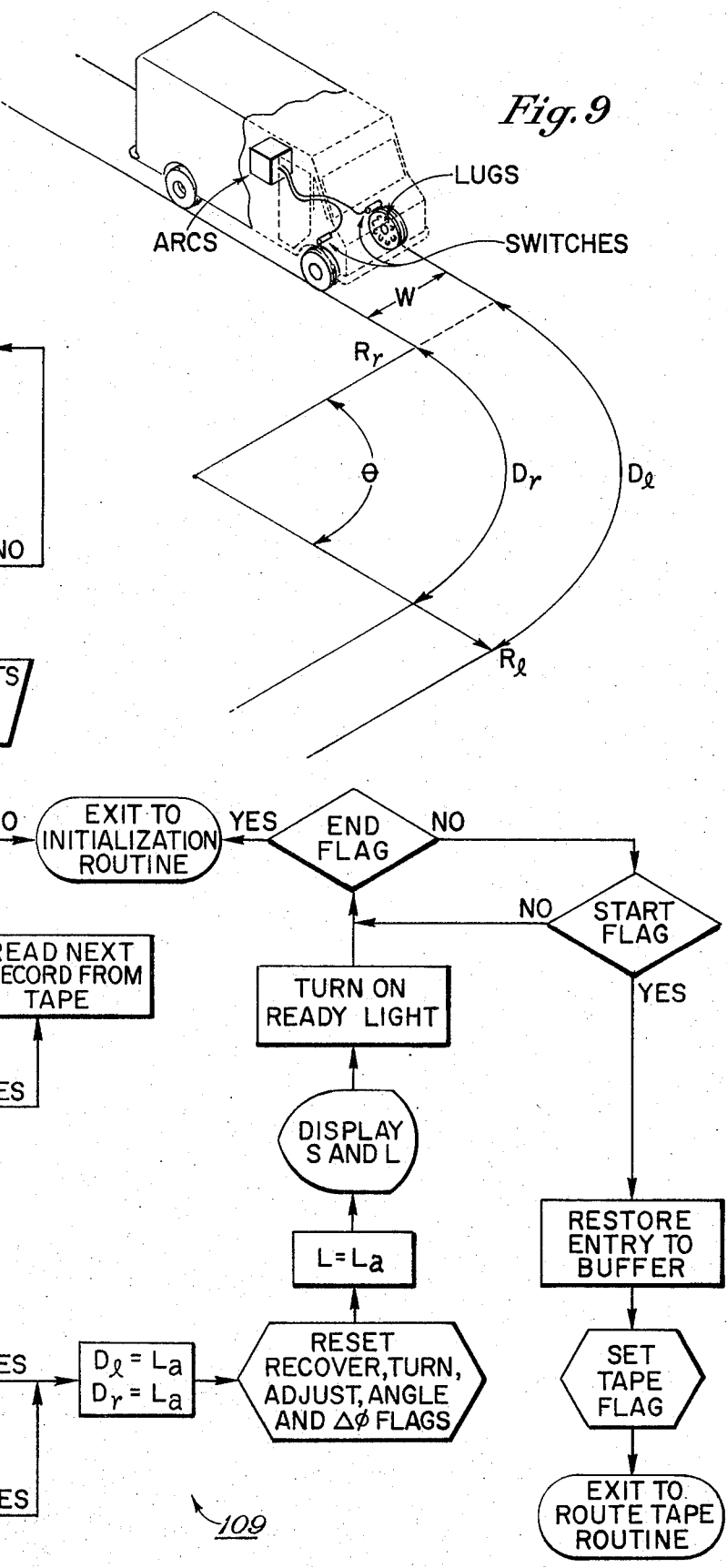
Fig. 15
Fig. 9

OVERALL FLOW DIAGRAM

PREPARE A MASTER ROUTE SEGMENT SIGNATURE DENOTING EACH POTENTIAL ACTION POINT, ITS LINEAL DISTANCE ALONG THE ROUTE SEGMENT AND NATURE AND DIRECTION OF ACTION TO BE PERFORMED THEREAT

↓

STORE THE MASTER ROUTE SEGMENT SIGNATURE

↓

AUTOMATICALLY PREPARE A ROUTE SEGMENT ACTION SIGNATURE FROM THE MASTER ROUTE SEGMENT SIGNATURE

↓

TRAVERSE ALONG THE PREDETERMINED ROUTE SEGMENT TO A NEXT ACTION POINT IN A VEHICLE EQUIPPED TO EFFECT THE RESPECTIVE ACTIONS AT THE RESPECTIVE ACTION POINTS, MEASURING, SIGNALING, AND MONITORING THE DISTANCE TRAVELED AND THE DEGREES OF TURNS BEING MADE

↓

EFFECT THE INDICATED ACTION AT AN ACTION POINT WHEN ITS PREDETERMINED LINEAL DISTANCE HAS BEEN REACHED

↓

MAINTAIN BELOW PREDETERMINED THRESHOLD LEVEL CUMULATIVE VARIATION BETWEEN DISTANCE TRAVELED SIGNAL AND THE ACCURATE DISTANCE TO RESPECTIVE ACTION POINTS

↓

END SEGMENT

IF AN ERROR IS MADE, GIVE ERROR SIGNAL AND METHOD OF CORRECTING THE ERROR

Fig 16

METHOD OF PREPARING MASTER ROUTE SEGMENT SIGNATURE

MAKE A PRELIMINARY CALIBRATION OF DISTANCE MEASURING MEANS OF A VEHICLE
↓
AUTOMATICALLY CALCULATE A CALIBRATION FACTOR FOR THE DISTANCE MEASURING MEANS, AND AUTOMATICALLY APPLY IT IN AUTOMATICALLY MEASURING AND RECORDING ACCURATE DISTANCES TO RESPECTIVE ACTION POINTS
↓
BEGIN AT AN INITIATION POINT
↓
→ CORRECTLY AND ACCURATELY TRAVERSE ALONG A PREDETERMINED ROUTE SEGMENT IN THE VEHICLE TO A NEXT ACTION POINT, SIMULTANEOUSLY AND AUTOMATICALLY RECORDING DIRECTION OF TRAVEL BY DEGREES OF TURN WITH RESPECT TO THE DIRECTION OF TRAVEL
↓
INDICATE AND DESIGNATE WITH A UNIQUE IDENTIFICATION AN ACTION POINT, INCLUDING RECORDING SIMULTANEOUSLY AND AUTOMATICALLY THE CUMULATIVE LINEAL DISTANCE ALONG THE ROUTE SEGMENT FROM THE INITIATION POINT TO THE ACTION POINT
↓
DENOTE AT THE ACTION POINT IF IT IS TO BE A CONTROL ACTION POINT, IF A FIRST OR SECOND SIGNAL IS TO BE GIVEN TO EFFECT AN ACTION TO THE LEFT OR TO THE RIGHT AND IF A THIRD, FOURTH, FIFTH, OR SIXTH SIGNAL IS TO BE GENERATED FOR A SPECIAL SIGNAL; FOR INDICATING TO THE DRIVER TO TURN TO THE LEFT, OR TO THE RIGHT; OR FOR ENDING THE SEGMENT
↓
└─ AT THE NEXT POTENTIAL ACTION POINT
↓
END SEGMENT

*Fig 17*

METHOD AND APPARATUS EMPLOYING AUTOMATIC ROUTE CONTROL SYSTEM

CROSS-REFERENCE TO RELATED APPLICATION

Ser. No. 52,533, entitled "Semi-Automated Delivery of Articles," filed July 6, 1970 by Richard V. Holsinger, now abandoned.

BACKGROUND OF THE INVENTION

1. Field of the Invention

This invention relates to method and apparatus facilitating effecting a plurality of actions at closely spaced predesignated action points along a predetermined route segment; for example, delivering articles in the commercial and residential neighborhoods. In a particular aspect, this invention relates to method and apparatus for effecting delivery of newspaper to subscribers in a residential neighborhood in accordance with a current list of subscribers along each route segment.

2. Description of the Prior Art

This invention is useful in a wide variety of applications. In fact, it may be employed advantageously in any application in which a vehicle is required to traverse one or more predetermined route segments that can be defined in advance. Examples of the uses which this invention may may be employed in include the home delivery of a variety of consumer products, such as newspapers; distribution to retail outlets; laundry and dry cleaning pick-up and delivery; armored car service; refuse collection; city bus systems; security patrols; monitoring of safety lights, such as street lights; and certain postal service and military functions. Obviously, a wide variety of apparatus and systems have been employed in these diverse technological areas.

For example, a wide varity of automated delivery systems have long been known in the prior art for delivering articles along fixed tracks or conveyors within a warehouse complex. Systems have ranged from simple mechanical devices employing gravity to complicated tracks for guiding driverless vehicles. It is apparent that the system of this sort would not be satisfactory for delivery in residential or commercial neighborhoods in which a variety of other drivers were operating.

Moreover, it was known in the 1920's to employ route display strips for moving a strip of map along the road for guiding the driver along a frequently unmarked or inadequately marked route. The driver could correlate significant landmarks along the way with the strip map. Also, the prior art shows references describing the playing of one or more announcements or sound recordings at predetermined points along the route by means of a punch tape that correlates relatively long distances with the points for the announcements. It is clear, likewise, that such apparatus could not be satisfactorily employed for effecting a closely spaced action, such as delivering newspapers to houses in residential neighborhoods.

Consequently, despite the automated delivery systems of the prior art, articles, such as newspapers, have continued to be delivered by news boys or the like, who were personally familiar with the subscribers and the general route through a residential neighborhood to effect the delivery of the articles. Recruiting, training and retaining a large corps of dependable news boys is becoming increasingly more difficult and more expensive. Moreover, with increasing urbanization, the subscriber lists may change rapidly as major companies move their force of employees from one city to another. Accordingly, the old system of employing a list of subscribers in the newspaper office and news boys in various locales to deliver the newspaper has become less efficient than desirable. The inefficiency is heightened when supervisory time and effort are required to be expanded in training new news boys to take over a given route segment.

It is desirable that a satisfactory system, or apparatus, for effecting the actions at closely spaced predesignated action points a long a predetermined route segment have one or more of the following desirable features not heretofore provided:

1. have vehicle-mounted apparatus that is completely self-contained without requiring transponders, beacons, or special markings along the route;
2. provide a method of mapping a route without requiring laboriously figuring exact distances from a city map or the like, to develop a route segment signature specifying the action points and the action to be performed thereat;
3. provide a route segment signature that is expressed numerically in terms of cumulative distances, turn angles, and respective action points, with the action encoded thereat;
4. provide a master route segment signature which includes all potential action points from which certain ones may be deleted if desired;
5. provide current information from which the master route segment signature including all potential action points can be modified to obtain a current route segment action signature;
6. provide calibration whereby accurate calibration factors can be calculated to ensure more nearly accurate distance traveled signals;
7. provide a preliminary calibration capability;
8. provide an adaptive synchronization in which the program and the cumulative distance traveled signals are brought together at predetermined control action points to reduce the cumulative variation therebetween;
9. provide adaptive calibration wherein the calibration factors are calculated at predetermined control action points;
10. provide turn analysis capability involving one or more of the following aspects: (a) using transversely aligned wheels of the vehicle spaced a predetermined width apart and means for measuring the distance traveled by each wheel and comparing to produce a differential distance that is employed to calculate the turn angle at frequent intervals for various purposes, (b) using auxiliary counters on the distance signals from two laterally aligned wheels and resetting the auxiliary counters at frequent intervals to ensure that cumulative turn error is never allowed to reach a magnitude that would cause a spurious error signal to be generated, (c) keying on the wheel nearest the center line of the street, (d) using the front wheels of a vehicle, (e) suspending the turn analysis during controlled and non- or uncontrolled turns, and (f) providing a controlled turn routine;
11. continuously measure the vehicle's location coordinates, compare these with route coordinates and issue commands appropriate to the location;

12. provide a carrier for the route segment action signature with the action points and the action defined thereon, the carrier being movable into a central computer system for bringing up-to-date before traversing a route segment and into a vehicle-mounted system for performing the actions at the closely spaced action points along the route segment;
13. provide a plurality of route segments on a given carrier such that no systems changes or adjustments are required to switch from one route segment to the next;
14. be able to issue explicit audio or visual driving instructions at appropriate points along the route;
15. issue audio or visual instructions regarding delivery, pick-up or other special actions to be performed at points along the route;
16. record manual data input and sensed data, including the location where the data acquisition occurs;
17. print receipts or other in situ documents pertinent to the activity to be performed at a predetermined action point;
18. detect deviation from the specified route and prescribe corrective action; and
19. provide vehicle-mounted apparatus that can afford signals intelligible to manual throwers; or at least to a manual supervisor monitoring the throwing of newspapers; such that the newspapers can be thrown safely, without risk of injuring a child, or the like, at the home of a receiver.

Several recent research approaches have been investigated, but as far as is known at this time, the prior art has not provided an apparatus that obviates the disadvantages of early apparatus and provides a plurality of the desirable features delineated hereinbefore; and particularly, the prior art has not provided method or apparatus which provides all of the desirable features delineated hereinbefore.

Accordingly, it is a primary object of this invention to provide method and apparatus for facilitating effecting actions at closely spaced predesignated action points along a predetermined route segment, as in commercial and residential neighborhoods, that obviates the disadvantages of the prior art apparatus and also provides a plurality of the desirable features delineated hereinbefore.

It is a specific object of this invention to provide apparatus having several of the desirable features delineated hereinbefore.

It is still a further object of this invention to provide apparatus having all of the desirable features delineated hereinbefore and not heretofore provided by the prior art.

These and other more specific objects will become apparent from the descriptive matter hereinafter, particularly when taken in conjunction with the enclosed drawings.

BRIEF DESCRIPTION OF THE DRAWINGS

FIG. 4 is an isometric view, partly cut away to reveal the interior, of a vehicle for delivering newspapers and incorporating the functions of FIG. 3.

FIG. 9 is a simplified vehicle and turn diagram illustrating the basic principle upon which the turn analysis is based.

FIG. 15 is a flow diagram of the error routine of FIG. 6.

FIG. 16 is an overall Flow Diagram

FIG. 17 is a Flow Diagram for preparing a master route segment signature.

DESCRIPTION OF PREFERRED EMBODIMENTS

Figure 1:
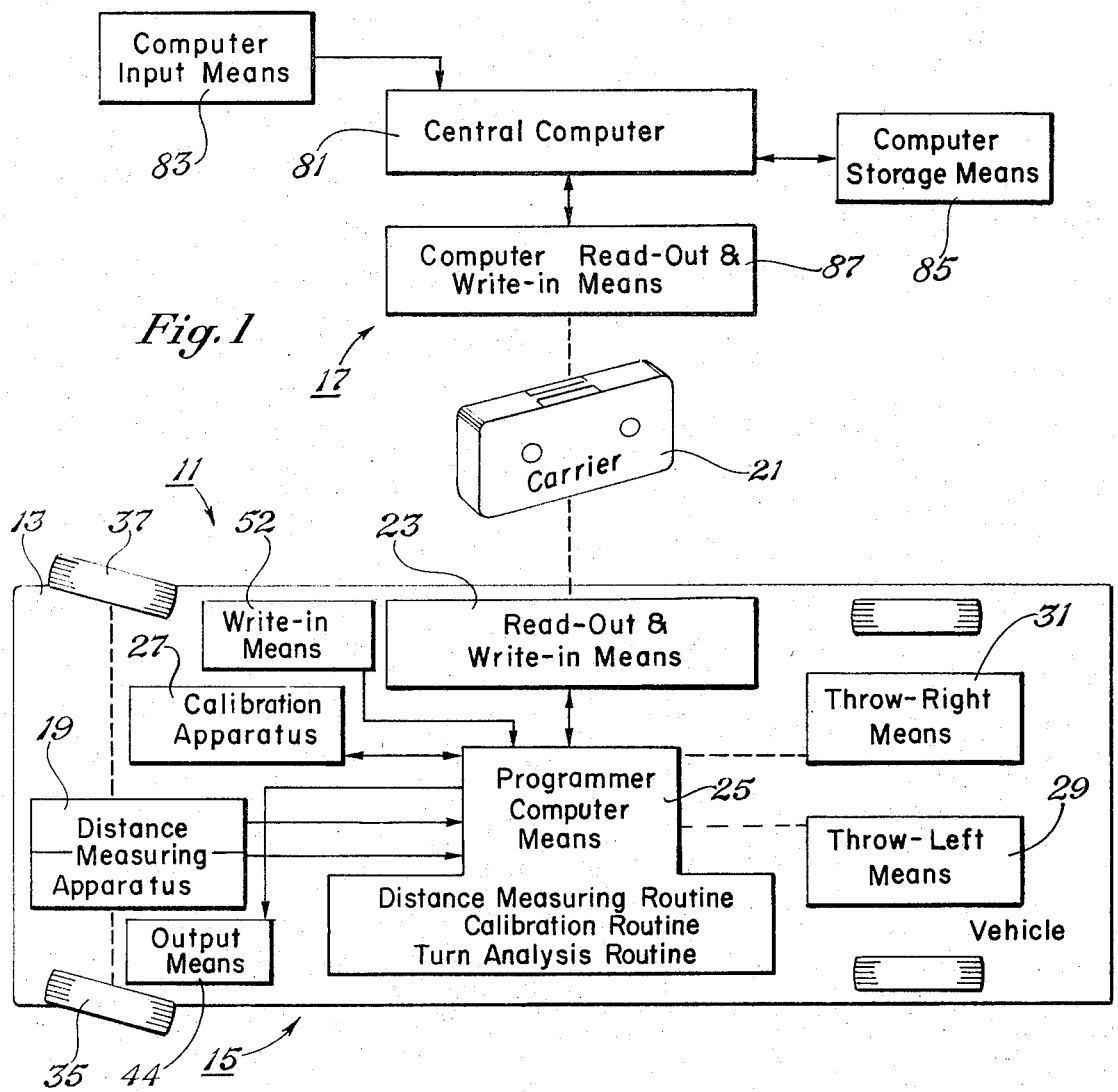
FIG. 1 is a diagrammatic illustration of one embodiment of this invention.

It is believed instructive to consider the development of the present invention and its overall flow diagram before progressing to more detailed information. The original concept that was developed in the late 1960's consisted of advancing a punched paper tape in synchronization with rotation of a "fifth wheel" that measured the distance traveled by the vehicle. The tape contained data defining locations where the paper should be thrown and caused an audio signal to be generated at the appropriate time for throwers. It was found, however, that a far more sophisticated system would be required because of the high accuracy necessary for throwing newspapers to the proper location. In particular, throw signals must be given within 15 or 20 feet of the proper location; otherwise, the thrower would be uncertain which house would receive the paper. Furthermore, if the driver missed a turn or turned off the route, the error had to be recognized and corrected immediately to prevent chaos.

Several approaches were evaluated, including the use of electronic sign posts, installation of special transponders located at each subscriber's house. Aside from the technique finally implemented, none of the other approaches were found to give an acceptable combination of accuracy, flexibility, control, and cost effectiveness.

Also considered was the use of fully automated delivery of the newspaper, as by a throwing arm or a "mortar" that propelled the paper from the vehicle automatically in response to respective first and second signals to indicate throw to the left or throw to the right. Because of the frequency with which small children would be playing in the yard, or a person would be working on the lawn or in the flower beds, it was decided that, for the present at least, manual supervision over the launching of the newspapers would be necessary. Consequently, manual throwers were employed because of the increased safety. The manual throwers can also operate automatic folding and bundling machines if they are placed in the vehicle. In many cases, automatic folding and bundling machines and their operator would be advantageously placed in the delivery vehicle to facilitate integration of an automatic route control system into a conventional organization and without requiring different ways of preparing the newspapers. In such cases, the use of manual throwers would not add appreciably to the expense; and this approach is deemed preferable over the use of fully automated delivery equipment with its lesser degree of safety.

Experience indicates that there are two basic capabilities required of an automatic route control system (ARCS) for effecting actions over fixed and predetermined route segments. These two capabilities are:
1. the system must continuously determine the position of the vehicle along the route segment; and
2. the system must be able to detect significant deviations from the route.

Once the first capability is met, the system is made to readily activate annunciators, or the like, affording visual or oral instructions and signals at appropriate points along the route. Similarly, appropriate error messages are given if the driver does not follow instructions. For a practical ARCS, some means of handling detours or deliberate, but unanticipated deviations is required, also.

A variety of applications may require addition of special actuators, signal devices, recording devices, printout devices, or the like, for performing special activities along the route. These devices will be activated automatically by the system at the appropriate points in accordance with instructions on the route segment action signature, as will become apparent hereinafter.

The approach used in this invention to determine the vehicle's position along the route and to detect deviations is based on the fact that any route driven from a given starting point has unique direction-distance definition as a part of its "signature." Expressed otherwise, the route and the vehicle's position along the route is defined by a sort of pseudo-polar coordinates. The polar coordinates sytem will be explained after the overall flow diagram and broad method and apparatus requirements have been outlined.

The overall flow diagram is shown in FIG. 16.

The apparatus of this invention is described in the context of a specific application, since this was the case with the prototype that was developed. Additional accountrements for effecting special actions are described also to demonstrate the high degree of flexibility and the wide variety of applications for which this invention may be used advantageously.

Referring to FIG. 1, there is illustrated an overall apparatus 11 for facilitating delivery of articles; such as, newspapers or circulars; on the fly to predesignated receivers in residential or commercial neighborhoods. The overall apparatus 11 comprises vehicle 13 with the vehicle-mounted apparatus 15 and a central computer system means 17 for up-dating, or bringing current, a list of the predesignated receivers, such as subscribers for the newspapers.

The vehicle 13 is a self-propelled vehicle that is provided for carrying the articles, such as newspapers, to be delivered to the predesignated receivers. The vehicle may be an automobile, but it is advantageous, ordinarily, to employ a vehicle having somewhat larger carrying capability so as to be able to carry a substantial load of the articles. For example, station wagons, or delivery vans may be employed. As illustrated, FIG. 4, the vehicle 13 is a modified and specially equipped International Harvester Metro 1500 Aluminum Deliver Van that has been designated automated delivery van (ADV). This ADV contains room to store the bundles of normally bundled newspapers, an automatic folding machine and its output of newspapers folded for delivery on the fly, as well as means for throwing the newspapers from the van to the receiver. The vehicle 13 also carries a pair of generators for supplying the requisite power levels for operation of the vehicle-mounted apparatus 15.

The vehicle-mounted apparatus 15 comprises distance measuring means, or apparatus 19 for measuring and signaling distance traveled; a carrier 21 carrying the route segment action signature, such as a delivery signature; read-out and write-in means 23 for interfacing with the carrier 21; programmer-computer means 25 for overall programming, computing, and signaling; and calibration means, or apparatus, 27 for maintaining below a predetermined maximum permissible error threshold cumulative variation between the distance traveled signal from the distance measuring means and the accurate distance to the respective action points. The vehicle-mounted apparatus 15 also includes the throw left means 29 and the throw right means 31 for throwing the newspapers respectively to the left and to the right upon generation of the respective first and second signals. As illustrated, the vehicle-mounted apparatus 15 also includes turn analysis routine for calculating the degrees of turn made by the vehicle.

The distance measuring apparatus 19 is connected with the vehicle 13 and capable of generating a plurality of discrete signals, one for each increment of distance travelled by at least one predetermined wheel of the vehicle 13. The signals are adapted for summation for measuring distance traveled by the vehicle 13 at least from a predetermined initiation point. The distance measuring routine generates a distance traveled signal that is a function of the distance traveled. As illustrated, the sensors for use with the distance measuring apparatus consist of proximity switches mounted at each front wheel such that they are actuated, or effectively closed, by the passage of lugs installed at a fixed radius on each front wheel. For the main distance traveled signal, it is preferable to use the output from the wheel nearest the center line of the street, or route segment. In countries like the United States where vehicles are driven on the right hand side of the road, this is ordinarily the left front wheel. As will become apparent hereinafter, it is necessary to employ an output from each of the laterally aligned and opposed wheels, such as the illustrated front wheels 35 and 37, to afford an accurate calculation of the degree of turn made by the vehicle. With this arrangement, the distance traveled signal comprises a summation of a plurality of discrete pulses, or spikes. In the illustrated embodiment, the pulses are operated upon, as by multiplication by a calculated calibration factor, before they are used to calculate the distance traveled on the degrees of turn made. Through the use of the discrete pulses, the cumulative distance traveled, speed, and direction can be developed by a mathematical analysis of the sensed quantities. For example, assume that the lugs are spaced such that a sensor is actuated every time a properly inflated tire rolls one foot along the surface of the ground. Thus, the cumulative distance traveled can be determined simply by counting the number of signals, or pulses, from one of the sensors. In conjunction with a timer or clock, the speed can be determined by counting the number of signals per unit time.

In calculating the degrees of turn, two counters are employed. The first counter is a cumulative distance traveled counter. The second counter is an auxiliary counter that is reset at frequent intervals such that cumulative turn error, as indicated by differential distance between the distance traveled by the respective wheels, is never allowed to reach a magnitude that would cause a spurious error signal to be generated; for example, advising the operator that he has made a wrong turn or failed to make a turn. This will be described in greater detail with respect to the turn analysis later hereinafter.

The carrier 21 carries the route segment action signature including, not only the route definition portion, but also the predesignated receiver portion. A second carrier is provided for data acquisition, as well as for increased capacity if needed. In said earlier filed and copending application Ser. No. 52,533, the carrier and its information was referred to as the "program." Because of the confusion with the program and the respective routines for the respective computers, that nomenclature has been changed herein. The carrier is physically movable into the central computer system means 17 so that the route segment signature can be generated and written into the carrier. The carrier 21 is also physically movable into the vehicle-mounted apparatus 15 so as to be drivingly connected with the programmer-computer means 25 such that the route segment action signature can be read out and written into the programmer-computer means 25.

As indicated hereinbefore, the route segment action signature contains accurate information as to the predesignated actions to be effected. The information is in the form of a plurality of respective action points correlated with respective distances along the predetermined route segment. Specifically, both the master route segment signature and the route segment action signature, such as the delivery signature, are formed as mathematical models in which is included for each action point a unique identity thereof, the cumulative distance in number of incremental distance units thereto expressed as a digital number, a code number indicating the respective signal to be generated thereat, and any degrees and direction of turn to be made adjacent thereto. Specific examples are given in the "Operation" section hereinafter.

As illustrated, the carrier 21 comprises a magnetic tape cartridge that has a format that is compatible with the read-out and write-in means 23 and 87 of both the central computer system means 17 and the vehicle-mounted apparatus 15. The information, such as the route segment delivery signature, is put into the carrier 21 in a form that can then be read out and written into the programmer-computer means 25, as will become clear hereinafter. For example, the information on the carrier 21 may be in the form of blocks of information having no more than six entries.

The read-out and write-in means 23 for interfacing with the carrier 21, receives the carrier and, responsive to signals from the programmer-computer means 25 reads the information from the carrier into the programmer-computer means 25. The read-out and write-in means 23 comprises a Tri-Data 4096 Dual Tape Cartridge Unit, illustrated by cartridge unit 39 in FIG. 3 and in the center of the equipment cabinet 41, FIG. 4. For greater capacity, the tape cartridge unit comprises a dual cartridge cabinet in which both top and bottom cartridges must be in place for the tape unit to operate. Ordinarily, the second cartridge may serve as a second carrier for data acquisition, as described hereinbefore and hereinafter. The lower cartridge may not be necessary to contain only necessary information for a predetermined plurality of route segments over which the vehicle is to be operated in delivering a given edition of newspapers. As is conventional, the term "cartridge", with or without adjectives "magnetic tape" or "tape" is employed herein to include both the cassette and the tape therewithin. As indicated hereinbefore and hereinafter, the tape contains the route segment action signature inserted hereonto for delivery and is employed in a mapping mode to accumulate data for the route segment action signature.

The programmer-computer means 25, FIG. 1, that is disposed in the vehicle is connected via a suitable interface unit with the distance measuring apparatus and the read-out and write-in means 23. The interface unit comprises conventional electronic circuits for converting the input information from the respective elements into a format compatible with the programmer-computer means 25. Each of the respective interfaces comprise commercial integrated circuits on a wire-wrap board to achieve compatibility in accordance with conventional electrical engineering. In addition, the equipment cabinet 41 has means for providing for circulation of filtered air and provides shock mountings to reduce mechanical failure from low frequency vibrations transmitted to the electronic components; all in accordance with conventional electrical engineering skills. The programmer-computer means 25 has switch means for responsively connecting it with the distance measuring means 19 and with the read-out and write-in means 23 at an initiation point. The programmer-computer means is programmed, as will be more clearly apparent with respect to FIGS. 6–15 described hereinafter, such that the programmer-computer means 25 generates respective first, second, third, fourth, fifth, or sixth signals designating respective action locations at which an action is to be performed, the nature of the action and whether the action is to be performed to the left or to the right. A specific example is given in the "Operation" section hereinafter. The generating of the signals by the programmer-computer means is in response to the distance traveled signal becoming equal to a distance for an action contained in the route segment action signature. The coded action contained at the action point is then effected by the programmer-computer means 25.

Figure 3:
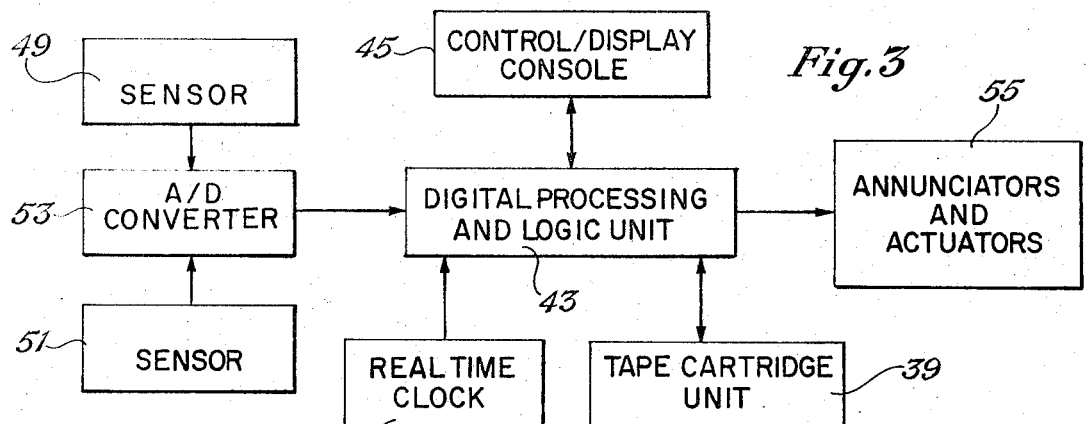
FIG. 3 is a block diagram showing the vehicle mounted elements of apparatus in accordance with one embodiment of this invention.

The programmer-computer means 25 is illustrated by a digital processing and logic unit 43, FIG. 3, located in the top of the equipment cabinet 41, FIG. 4. Specifically, the digital processing and logic unit comprises a BIT 483 mini-computer. The programmer-computer means 25 analyzes inputs from a control display console 45, also referred to as "control console" and simply "console," FIGS. 3 and 4, the tape cartridge unit 39 and the other input units, such as the real time clock 47 and the respective sensors. The respective sensors may include sensors 49 and 51, such as wheel lugs and proximity switches, whose outputs are connected through analog-digital (a/d) converter 53. Preferably, their functions are performed by the programmed digital processing and logic unit 43 as described hereinafter. In any event, the digital processing and logic unit 43 issues appropriate instructions by way of an output means 44, FIG. 1, such as annunciators and actuators 55, FIG. 3. Typical of the annunciators and actuators 55 are audio tape player 57 and the auxiliary panel 59. The audio tape player 57 is advanced automatically to give route instructions and special instructions. The auxiliary panel 59 contains signal lights for instructing the driver to turn left or right. An audio signal device, or horn, is also provided to sound when an error has been made or when some special action is to be taken.

Figure 5:
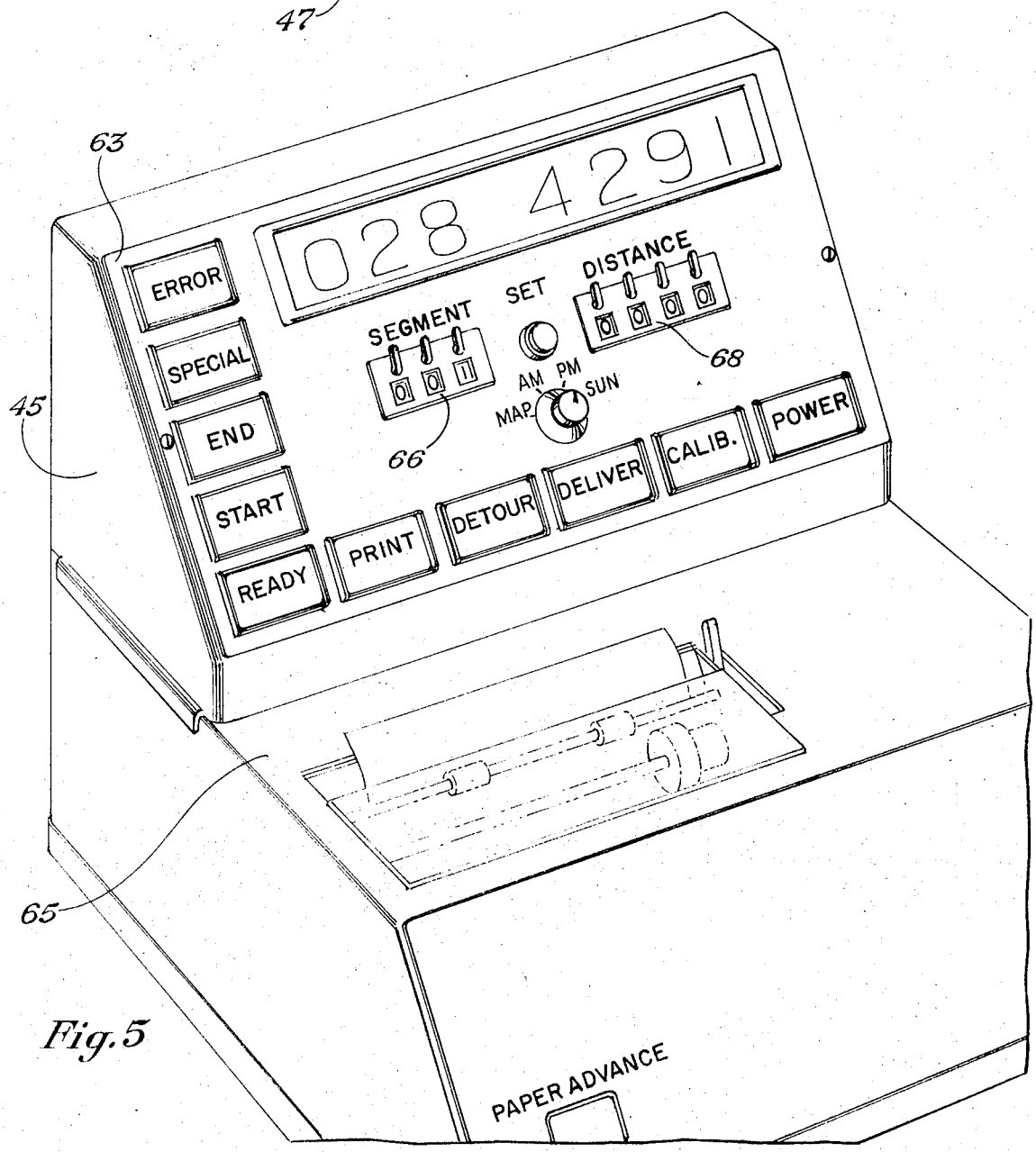
FIG. 5 is an isometric view of the control-display console of the embodiment of FIG. 4.

The control display console 45 is illustrated in FIG. 5 in detail. As can be seen in FIG. 4, the control display console 45 is located behind the windshield center post within convenient reach of the driver. It is high to permit the driver to view the control display console 45 without taking his eyes off the road. The control display console 45 consists of two units. The upper unit 63 is a panel containing switches and indicators for operating the route control system. The lower unit 65 is a message printer for printing certain types of information and instructions issued by the vehicle-mounted apparatus 15; particularly in response to programmer-computer means 25. The switches on the upper panel select the mode of operation or the function to be performed and, in some cases, start or end the function. The switches light up, with the exception of the END switch, to indicate their status, and are color-coded for easy identification. The Nixie-tube numeric display shows the segment number and the distance (in feet) traveled from the beginning of the segment when operating in the delivery mode. The lever wheel switches 66 and 68 are for setting in the segment and starting point. With the lever wheel switches, also, a notation may be made as to the distance along the route at which a particular run was discontinued for some reason. Thereafter, the run may be continued at this point by setting the same number into the lever wheel switches.

The throw left means 29 and the throw right means 31 are described at this point to afford continuity. As illustrated, the means for throwing left and throwing right comprise throw stations 69 and 71, located on each side of the ADV, just behind the wells for the sliding entry doors. Each station includes a swivel seat 72 with seat belt, an adjustable foot rest 74, a large window with sliding cover 76, and a pair of earphones 78 with control box. Microphones and headsets are provided for communication between the driver and the throwers. The throw windows are equipped with deflectors (not shown) to help protect the throwers from wind and weather. The sliding covers 76 may be locked in a fully open, or any intermediate position. The earphone control 61 allows adjusting the intensity, or volume, of the throw signals. A built-in test signal generator is included to facilitate adjusting the volume. As indicated hereinbefore, manual throwers are preferred because of the increased safety that can be effected thereby. When the manual throwers are employed, the ARCS includes special annunciators comprising separate audio tone and earphone channels and throwers earphone controls 61 for the left and right thrower seats. As will become apparent from the routines hereinafter, special circuitry is included to produce a throw signal with a lead distance that is proportional to the vehicle's speed in order to allow the throwers ample time to respond and accurately deliver the newspapers on the fly even at speeds of from 15 to 30 miles per hour (mph) in the neighborhood in which delivery is being made.

As indicated hereinbefore, a Stepper model 822B paper-man folding machine 73 with a two-hopper collating unit and a double and triple folding unit is mounted in the aisle toward the rear of the ADV. The collating unit is at the rear and the folding unit is between the wheel wells. The folded papers are discharged between the thrower stations 69 and 71. This machine folds papers at a rate of 64 per minute. The papers may be folded and tied with or without weatherproof wrappers. Only one hopper of the collating unit is ordinarily employed, unless the paper is in two parts; for example, the Sunday paper. Six racks are located along each side of the ADV near the folding machine for storing paper bundles. A movable bin for catching discharged folded papers sits in the floor in the front of the machine. The bin is rotated 90° and placed on a fold-down platform at the front of the machine to put folded papers within convenient reach of the throwers. Three bins are provided. While one bin is being used, another may be filled, and the third may be held in reserve. One bin holds the equivalent of over three paper bundles. The folding machine is mounted on a track and may be rolled forward to allow easy access to load the bundle racks. In addition, the machine may be cranked to either side of the aisle to facilitate adjustment.

The generators referenced hereinbefore are illustrated by exterior generator panel 75. One of the generators is a 5 kilowatt generator and the other is a 2.5 kilowatt generator to allow complete flexibility. For example, the 5 kilowatt (kw) generator can take over the job of the 2.5kw generator if necessary. The generator control panel 77 is provided for monitoring by the driver, and for use in starting and stopping the generators.

The calibration apparatus 27 is connected with the programmer-computer means 25 and includes a plurality of different means including calibration, start and end switches, and distance setting wheels; that control the calibration routine and subroutines in the programmer-computer means for maintaining below a predetermined maximum permissible error threshold the cumulative variation between the distance traveled signal and the accurate distance to a respective action point. As will become clear from the calibration routine of FIG. 7, the calibration routine includes first means, or first sub-routine, for automatically calculating a calibration factor for the signals, such as the pulses, from the wheel to which the distance measuring means, or second sub-routine, is connected and a second means for automatically converting the pulses from the wheel with the calibration factor to a distance traveled signal. For example, as will become apparent from the program routines, the value of the calibration factor is added instead of a 1 being added for each pulse effected by movement of a lug past a proximity switch at the wheel. Each of the distance measuring means connected with each wheel has the respective first and second sub-routines. The calibration routine includes a preliminary calibration capability for calculating a calibration factor before beginning a run, either mapping or delivery, if delivery is the action to be performed. Moreover, the calibration routine includes a synchronization sub-routine having an adaptive synchronization capability, as well as an adaptive calibration capability.

It is not necessary for the wheel lug spacing to correspond to any specific distance of travel provided a calibration factor is available to convert the number of sensor signals, or counts, to true distance. The controlling factor in the selection of the lug spacing in the distance measuring means is the amount of resolution desired in the distance measurement or the measurement of direction changes. For example, a lug spacing having approximately 0.47 feet of travel has given adequate resolution thus far. The calibration may be determined automatically by means of a software routine incorporated into the operating program of the digital processing and logic unit. The routine is selected, or called up, by pressing the CALIBRATE switch on the display control console 45. To prepare for calibration; for example, a preliminary calibration; the driver sets $D_c$, a known distance between two points on a straight course, on the lever wheel switches and presses the SET switch to transfer the known distance to the digital processing and logic unit. To calibrate, the driver aligns the vehicle with the beginning point of the straight course, presses the START switch and then proceeds to drive straight to the end point. With no further action on the part of the driver, the digital processing and logic unit counts the number of signals from each of the two wheel sensors while driving to the end point. At the end point, the driver presses the END switch. Thereupon, the digital processing and logic unit calculates the left calibration factor $C_l$ and the right calibration factor $C_r$ using the equations:

$$C_l = D_c/N_l, \text{ and} \quad (1)$$

$$C_r = D_c/N_r \quad (2)$$

Where $N_l$ and $N_r$ are the total number of counts from the left and right wheel sensors, respectively. The calibration factors are automatically stored by the calibration routine for use in calculating true distances until replaced by new factors from a subsequent calibration, as from the adaptive calibration.

Changes in temperature, atmospheric pressure, tire pressure, vehicle loading, and other factors, such as speed, can effect the accuracy of cumulative distance measurement, even after a calibration run has been performed. Even with perfect calibration, distance errors tend to occur because of variations in the vehicle path resulting from passing, lane changes, cutting corners, dodging children, and the like. Adaptive synchronization is provided to automatically remove such errors in the cumulative distance indicated by the left wheel counter before they become great enough to cause error signals, erroneous driving signals or other instructions to be issued at an incorrect location. The adaptive synchronization is performed automatically by the route signature routine 107. Each time the midpoint of a controlled turn is reached, the routine substitutes the correct, or mapped, cumulative distance to the midpoint of the turn $L_m$ for the distance currently indicated for the left wheel distance traveled. Thus, errors in the cumulative distance measurements are never allowed to accumulate for more than the distance traveled between two successive controlled turns. As a result, the location accuracy is essentially independent of the total distance traveled from the beginning of the route segment. The exact procedure will become clearer from the descriptive matter with respect to the route signature routine of FIG. 17 later hereinafter.

Each time adaptive synchronization occurs at the midpoint of a controlled turn, the adaptive calibration routine computes a new calibration factor $C'_l$ automatically by using the equation:

$$C'_l = D_e C_l / D_m \quad (3)$$

wherein $D_m$ is the distance measured between the previous midpoint and the current midpoint (in case the current midpoint is the first midpoint, $D_m$ is the distance from the beginning of the route to the midpoint), $D_e$ is the expected distance between the midpoints based on the mapping data and $C_l$ is the previous calibration factor. The new calibration factor may be substituted directly for the old factor for use in converting subsequent counts to distance. On the other hand, the old factor may be replaced by a weighted average from a summing means of the old and new to reduce sensitivity to spurious driving.

Properly employed, adaptive calibration may eliminate the need for conventional calibration, such as a preliminary calibration, since the approximate calibration factor from the last run remains stored in the memory of the digital processing and logic unit to serve as an approximate factor for starting the next run. Because of the large number of turns in most neighborhoods, the calibration factor is quickly corrected for the variables for the particular day's run. On the other hand, a good preliminary calibration run and the frequent adjustment effected by adaptive synchronization can make the adaptive calibration unnecessary in delivering newspapers, since there are frequent turns on a newspaper route segment.

The turn analysis routine is effectively responsively connected with the distance measuring apparatus 19 for both wheels, and is adapted to calculate direction and degree of turn in terms of positive or negative angle effected by differential distance traveled by the respective wheels being monitored by the distance measuring routine. When the vehicle 13 proceeds straight ahead, the count rate from the two wheels, such as front wheels 35 and 37, will be equal; assuming ideal conditions and equal relative placement of the lugs. If the vehicle makes a turn, one wheel will travel several feet farther than the other wheel. Referring to FIG. 9, the distances $D_l$ and $D_r$ traveled by the two wheels during a right turn is given by the equations:

$$\text{left wheel: } D_l = 2\pi\theta R_l/360 \quad (4)$$

$$\text{right wheel: } D_r = 2\pi\theta R_r/360 \quad (5)$$

where $\theta$, the angle of turn, is expressed in degrees and the turn radii $R_1$ and $R_r$ are expressed in feet. The difference in distance traveled by the two wheels is:

$$\Delta D = D_1 - D_r = (\pi\theta/180)(R_1 - R_r) \quad (6)$$

But, since $R_1 - R_r$ is effective vehicle width, $W$, the difference in distance traveled by the two wheels is simply:

$$\Delta D = \pi\theta W/180 \quad (7)$$

Expressed otherwise, the turn angle $\theta$ is defined as follows:

$$\theta = 180 \, \Delta D/\pi W \quad (8)$$

Thus, it can be seen that the angle of turn is a function of the differential distance measured for the travel of two laterally aligned wheels of a vehicle having a given width. It does not matter whether the vehicle travels 50 feet or 500 feet in the process of making a given turn, or whether the turn is made on a uniform radius or not; one wheel will still travel exactly $\pi 74 \, W/180$ feet farther than the other wheel. If the right wheel distance is less than the left, it indicates that a right turn has been made. Similarly, a larger right wheel distance indicates a left turn. It has been found advantageous to employ a discrete code for the direction of the turn, although the sign of the differential distance will automatically denote the sign and, hence, direction of turn. This phenomenon forms the basis for a large part of the control logic used in the automatic route control system. Where an incremental unit is calculated, as in monitoring for unauthorized turns the turn angle is arbitrarily referred to as $\Delta\phi$ to prevent confusion with the expected angle of turn $\theta$ in controlled turns.

As indicated hereinbefore, the turn analysis requires the use of transversely aligned wheels of the vehicle, such as the front wheels, and means for measuring the distance traveled by each wheel and comparing the two distances traveled to produce the differential distance; which is then used to calculate the turn angle at frequent intervals. Also as indicated hereinbefore, the turn analysis is keyed upon the wheel, such as the left wheel, next to the center line of the roadway. Thus, the distance the left wheel travels may be selected as the arbitrary base and the signs of the angle calculated in accordance therewith, if signs of the angles are employed instead of code numbers. Moreover, the use of auxiliary counters that are reset at frequent intervals for the distance output from the respective wheels prevents cumulative turn error from reaching a magnitude great enough to advise the operator of a wrong turn in the event that he is merely changing lanes, or the like, in driving over the route. Any desired turn error threshold can be employed, but experience has indicated that an angle of from 30° to 45° does not create any problems when the auxiliary counters are employed.

Two different routines are used to detect and analyze turns when driving under automatic route control. One routine, an unauthorized turn routine, is used to detect unauthorized turns. Another routine, a controlled turn routine, is used to verify controlled turns. The two different routines are comprised of a plurality of sub-routines in the arbitrarily organized routines described hereinafter; including the interrupt input routine, the route signature routine, the route tape routine, and the error routine. Expressed otherwise, the unauthorized turn routine and the controlled turn routine may be brought into play by a portion of a primary routine, such as the route signature routine, but involve a variety of other sub-routines such as data acquisition via the interrupt input routine and generation of signals such as by the error routine. The controlled turns are also referred to herein as "control turns," since they also control, as in adaptive synchronization and adaptive calibration. As will become apparent from the detailed description of the route signature routine of FIG. 14, the software routine for detecting unauthorized turns is used at all times while driving under automatic route control except when within the limits of controlled or uncontrolled turns. An uncontrolled turn is a turn that may be gradual, such as along a gradual street curve, and is required to conform to the street; but is so elongated that it does not form a good controlled turn point. During such uncontrolled turns both the unauthorized turn routine and the controlled turn routine are suspended such that the vehicle and the driver are allowed a "free" turn without supervision by the automatic route control system. Entry into and exit from such uncontrolled turns are indicated on the route segment action signature. The unauthorized turn routine operates the separate auxiliary counters for the left and right wheel sensors and resets these counters at frequent intervals. For example, when the left wheel counter reaches a preset limit; for example, sufficient to give a distance of 120 feet; the routine starts over again calculating $\Delta\phi$, the unauthorized turn angle. The calculation is in accordance with formulas (6) and (8) hereinbefore. The exact procedure is given with respect to FIGS. 8 and 14 hereinafter. Upon indication of an unauthorized turn, the routine turns on, via the error routine 109, the error signal and causes a description of the error to be printed on the message printer. Since 20 feet or so are generally required to complete a turn, unauthorized turns are detected within a maximum of approximately 100 feet after they are made, assuming the 120 feet interval is employed. To allow for lane changes and minor variations that can be made in the proper path of the vehicle the turn error threshold must be exceeded before calling out an error, hence the previously described turn error threshold of from 30° to 45°.

The controlled turn routine is used to detect and verify controlled turns. A predetermined distance; for example, 50 to 75 feet; before the midpoint of a controlled turn, the controlled turn routine sets the left and right wheels' auxiliary counters to zero and then, as each successive count; or, more accurately, each calibration factor for each pulse; is added by the interrupt input routine 97 to the left wheel auxiliary counter, or monitor, the programmer-computer means 25 computes the new value of $\Delta\phi$. As long as $\Delta\phi$ is less than $\theta/2$, the expected value of $\Delta\phi$ at the midpoint, the calculation and comparision is repeated with each additional count from the left wheel. If the midpoint has not been reached at a predetermined distance, such as the 50 to 75 feet, beyond the expected location, the routine turns on, via the error routine 109, the error signal and prints a message stating that the turn was missed. Upon reaching the midpoint where $\Delta\phi = \theta/2$ the routine continues to calculate $\Delta\phi$ but compares it with $\theta$, the expected value of $\Delta\phi$ upon completion of the turn. Experience indicates that a 50 foot limit used in turn analysis is satisfactory. Other limits could be employed, if desired. When between the beginning and end points of a controlled turn also, the unauthorized turn routine is suspended, just as it was for the uncontrolled turn. A description of the detailed routines operative in the programmercomputer means 25 will be given in the "Operation" section later hereinafter; since the routines are, in effect, operational flow sheets rather than equipment, per se.

The central computer system means 17 is provided for generating and writing a route segment action signature, such as the delivery signature, from a master route segment signature. The route segment action signature contains a plurality of action points that are closely spaced and related to lineal distance along the predetermined route as indicated hereinbefore. The central computer system means 17 comprises a central computer 81, a computer input means 83, a computer storage means 85, and a computer read-out and write-in means 87.

The central computer 81 comprises an IBM 1130 computer that is adapted for magnetic disc storage. The central computer 81 is programmed to provide two-way flow of information, into and out of the computer storage means 85 and to correlate the information between plurality of storage files. The central computer system means 17 employs a plurality of files built as follows. An auxiliary file comprises an index of streets in alphabetical order and their respective locations in File B on the computer storage means 85. A master file of subscribers, referred to arbitrarily as File B, is built with the subscribers ordered by street and ascending house number on a given street. Then there is built a File A of control records in route segment sequence with pointers included into the master file, File B, to chain entries with control records in route sequence as described hereinbefore. The forward and backward pointers in File B afford helpful accessing information to the computer and facilitates making corrections automatically by the computer as information is typed thereinto by the computer input means 83. This type handling of data is conventional data processing employing programs and routines available from the supplier of the computer. A method of writing a route segment action signature is described in the "Operation" section hereinafter. Accordingly, no other detail is required at this point.

The computer input means 83 comprises an IBM 2741 typewriter terminal and a standard punch card reader that are connected with the central computer 81. The typewriter terminal portion of the input means 83 is operated by a secretary, or the like, to supply current information, such as telephone calls, as they are received, adding or deleting subscribers from the current subscriber list. As the information is typed into the computer input means 83, it is supplied to the central computer 81; and, thence, to File B in the computer storage means 85. The standard punch card reader portion of the computer input means 83 is used to read in, or write in, the master route signature as described later hereinafter.

The computer storage means 85 comprises an IBM 2315 magnetic disc storage unit that is connected with the central computer 81. The computer storage means 85 operates in the conventional manner to preserve whatever data is given it so that the data can be retrieved by the central computer 81 to carry out its programs; for example, generating a route segment action signature for the readout and write-in means 87 to write into the route tape, or carrier 21.

The computer read-out and write-in means 87 comprises a Tri-Data 4096 tape cartridge unit, similarly as described with respect to read-out and write-in means 23 of the vehicle-mounted apparatus 15. Accordingly, the computer read-out and write-in means 87 is adapted to handle the carrier 21. Both read-out and write-in means 23 and 87 are adapted to provide a two-way flow of information in the illustrated embodiment such that information can flow from the vehicle-mounted equipment 15 into the central computer 81 after mapping or from the central computer 81 into the programmer-computer means 25 in the vehicle-mounted apparatus 15 for delivery.

All of the elements of the central computer system means 17; namely, the central computer 81, the computer input means 83, the computer storage means 85, and the computer read-out and write-in means 87; are located in the central office and are operated by operating technicians, such as the programmers, the secretaries, and other personnel normally associated with such computer systems.

Operation

In operation and as indicated in the Overall Flow Diagram hereinbefore, the first step is to prepare a master route segment signature denoting all of the potential action points along a route segment. The preparing of the master route segment signature; with all of the prospective, or potential, action points, their respective lineal distances along the route segment and the nature and direction of the action to be performed at each action point; can be performed by any satisfactory method. One method is to employ accurate city maps with suitable instruments, such as distance and angle measuring devices, to define the master route segment signature in terms of the desired pseudo-polar coordinates. Our experience has indicated, however, that it is better done by actually driving over, or traversing, along the route with the vehicle-mounted apparatus 15. This process of traversing along the route and defining by cumulative relative direction and distance the action points is referred to hereinafter as "mapping." Such a preferred method of preparing a master route segment signature by mapping is shown in FIG. 17.

Specifically, the signature includes the route definition portion defining by lineal distance along the route segment the control action points, such as controlled turns as well as uncontrolled turns; and it includes the action portion defining by lineal distance, also, the respective other action points at which other action, such as throwing the newspaper to the left or the right, must be performed. Thus, the route definition portion of the master route signature comprises a sort of pseudo-polar coordinates in which the changes in direction of turn of the vehicle and the cumulative distance from an initiation, or start of the route, is indicated. If desired, an arbitrary direction may be assigned for true direction but the true directions need never be known, since only relative directions with respect to the beginning direction of the vehicle is sufficient for defining the pseudo-polar coordinates.

Two parameters are sufficient for defining a controlled turn: (1) the cumulative distance from the beginning of the segment to the midpoint of the turn, it being recalled that the midpoint of the turn is the distance at which the vehicle has turned through an angle of $\theta/2$; and (2) the total angle of the turn, $\theta$. Mapping is semi-automated by a software feature of the automatic route control system which locates the midpoints of the turns. Functionally, the mapping is simple. For the mapping routine to be clearly understood, a portion of the main program, including other supporting routines will be described.

The operational discussion hereinafter will include reference to the respective operating program and the routines used therein. Since the documentation of the actual program consists of annotated listings that are meaningful only to a programmer intimately familiar with both the ARCS prototype project and the assembly language of the BIT 483 mini-computer used as the programmer-computer means 25 for the prototype system, only the flow carts of the routines are included herein. It is to be understood that shortcuts are available for some of the processes or portions of the routines involving common operations and that an experienced programmer will use such shortcuts to reduce coding time, machine time, and core memory requirements.

Figure 6:
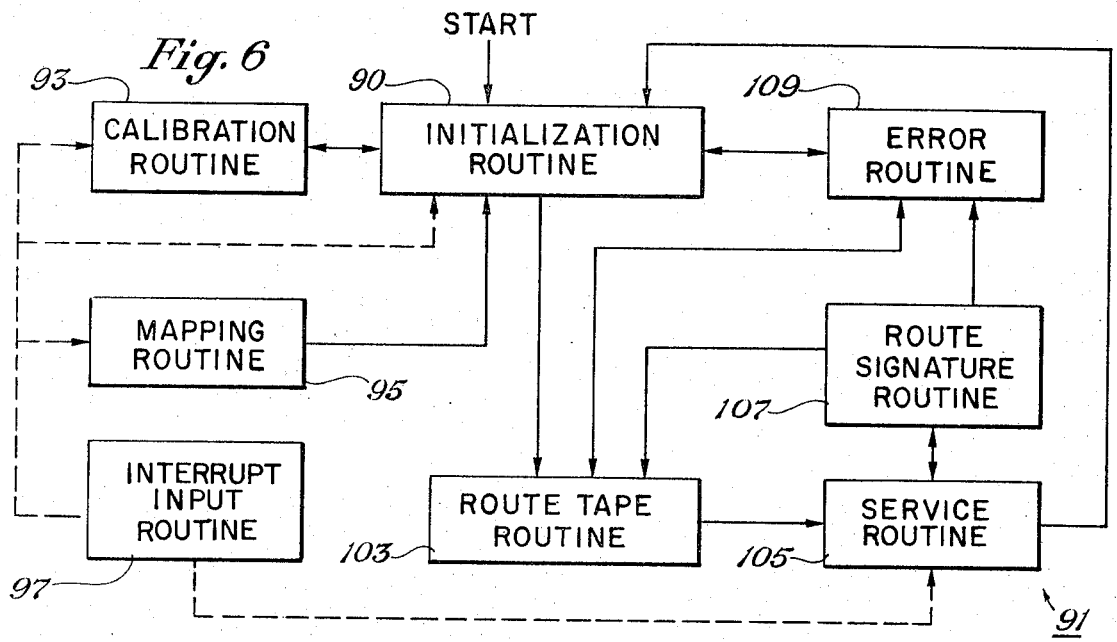
FIG. 6 is a block diagram of an operating program for use with the programmer-computer of FIGS. 1 and 4.

In the routine flow charts and descriptions the following symbols are used to designate a number of the operating parameters:

$D_l$  Left wheel distance
$D_r$  Right wheel distance
$C_l$  Left wheel calibration factor
$C_r$  Right wheel calibration factor
$K$  Left wheel distance at beginning of time period $A$  Difference between wheel distances at beginning of turn
$N_l$  Left wheel count for calibration
$N_r$  Right wheel count for calibration
$D_a$  Lead distance
$D_c$  Input calibration distance
$S$  Segment number
$L$  Distance within segment
$L_a$  Distance within segment to action point
$L_m$  Distance within segment to midpoint of controlled turn or end point of uncontrolled turn
$\theta$  Expected turn angle
$\Delta\phi$  Observed change in direction
$F$  Factor to convert distance differential to angle $T$  Time
$\Delta T$  Time interval between clock interrupts
$T_c$  Input lead time
$M$  Line number for mapping data
$B$  Left wheel distance at beginning of $\Delta\phi$ calculation The ARCS real time operating program consists of 8 routines, as illustrated in FIG. 6. The program resides in the core memory of the programmer-computer means 25 and runs at all times when the programmer-computer means 25 is turned on. When the system is first turned on, the initialization routine runs until the vehicle driver selects a mode of operation on the control display console 45. When the selected operation is terminated or completed, the program returns to the initialization routine until another mode of operation is selected or until the system is turned off. As illustrated, the program 91 comprises the 8 different major routines that control the action of the programmer-computer means 25. The 8 routines are simply a break down of the overall program into different size routines that are easiest to handle. There is not a one-to-one correspondence between the names of the routines and the functional operations performed, although it is clear from consideration of the steps of the routines when the different functions are being executed. For example, the route signature routine encompasses all of the activities relating to analysis of turns, both controlled turns, uncontrolled turns and analyzing for unauthorized turns. The principal routines of the program that will be employed before operating over a previously mapped route are the initialization routine 90, a sort of idling routine that is the beginning and the end point; a calibration routine 93 for developing accurate calibration factors for converting wheel sensor signals to a distance traveled; and the mapping routine 95 for recording the location of houses and locating and recording the location of turns on a route segment. In FIG. 6, the solid lines indicate the direction of travel in going from one routine to another, whereas the dashed lines show, not routes that the program travels, but rather routes in which information is fed. Specifically, the dashed lines all flow out of the interrupt input routine, for reasons which will become apparent later hereinafter.

Figure 7:
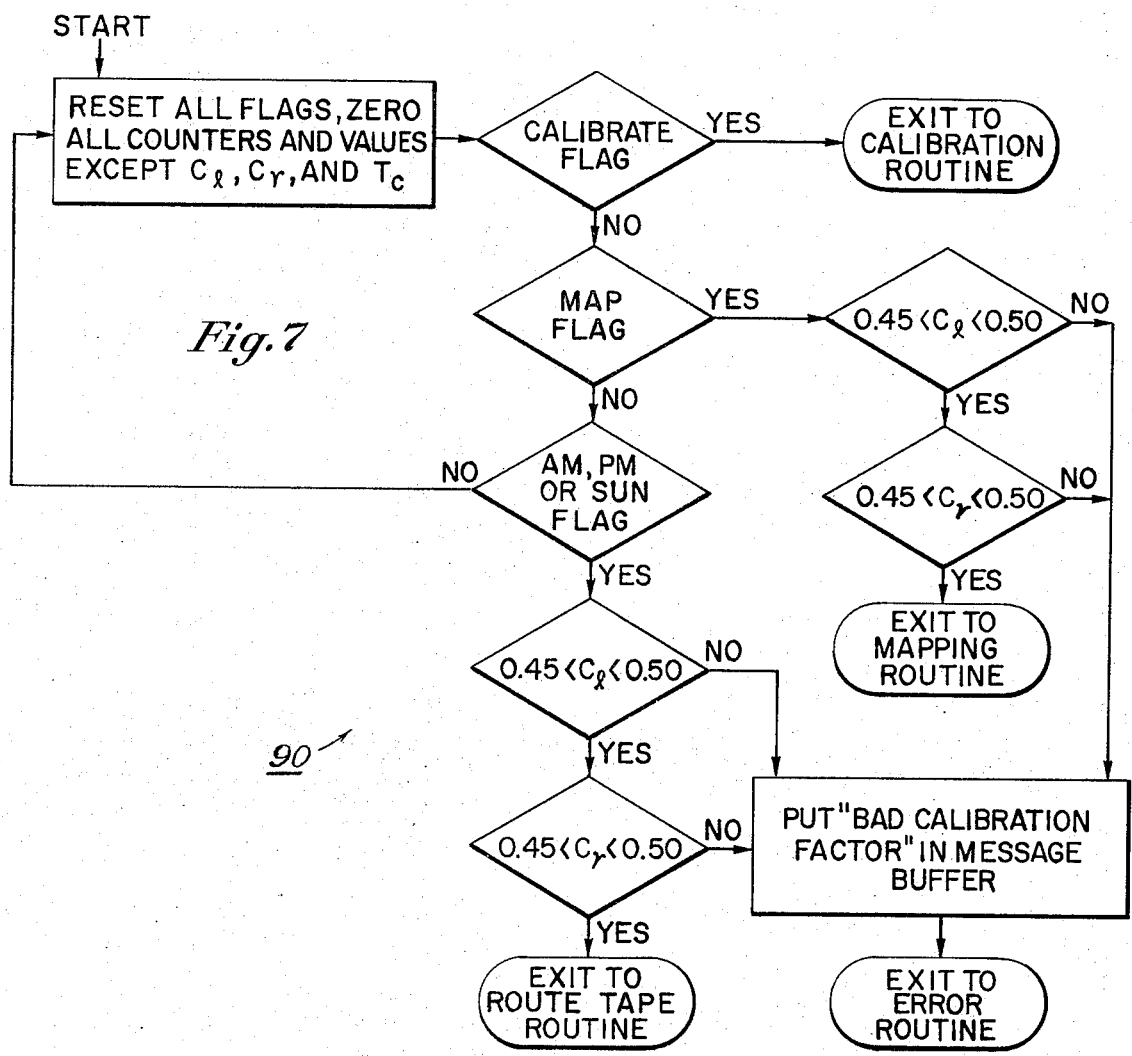
FIG. 7 is a flow diagram of the initialization routine of FIG. 6.

When the programmer-computer means 25 is first turned on, the program starts operating in the initialization routine which is flow charted in FIG. 7. The program also returns to the initialization routine from various other routines as indicated by the overall flow charts shown in FIG. 6. In any event, the initialization routine first resets all flags, counters and operating parameters with the exception of the lead time constant $T_c$ and the calibration factors $C_l$ and $C_r$ for the left wheel and the right wheel. In the program 91 and the routines thereafter, conventional programming symbols are employed in which a diamond shaped block indicates a decision block; a rectangular block usually denotes some mathematical or processing action; the oblong block, or almost oval block, generally represents an exit out of a routine.

Monitoring all of the other operations; and, particularly, monitoring the sensors for incoming data is the interrupt input routine 97. The interrupt input routine 97 will interrupt any other operation that the programmer-computer means is performing to supply data, such as a pulse from the wheel switches to indicate the traveling of another increment of distance. Thus, the interrupt input routine is a dominant feature.

Figure 8:
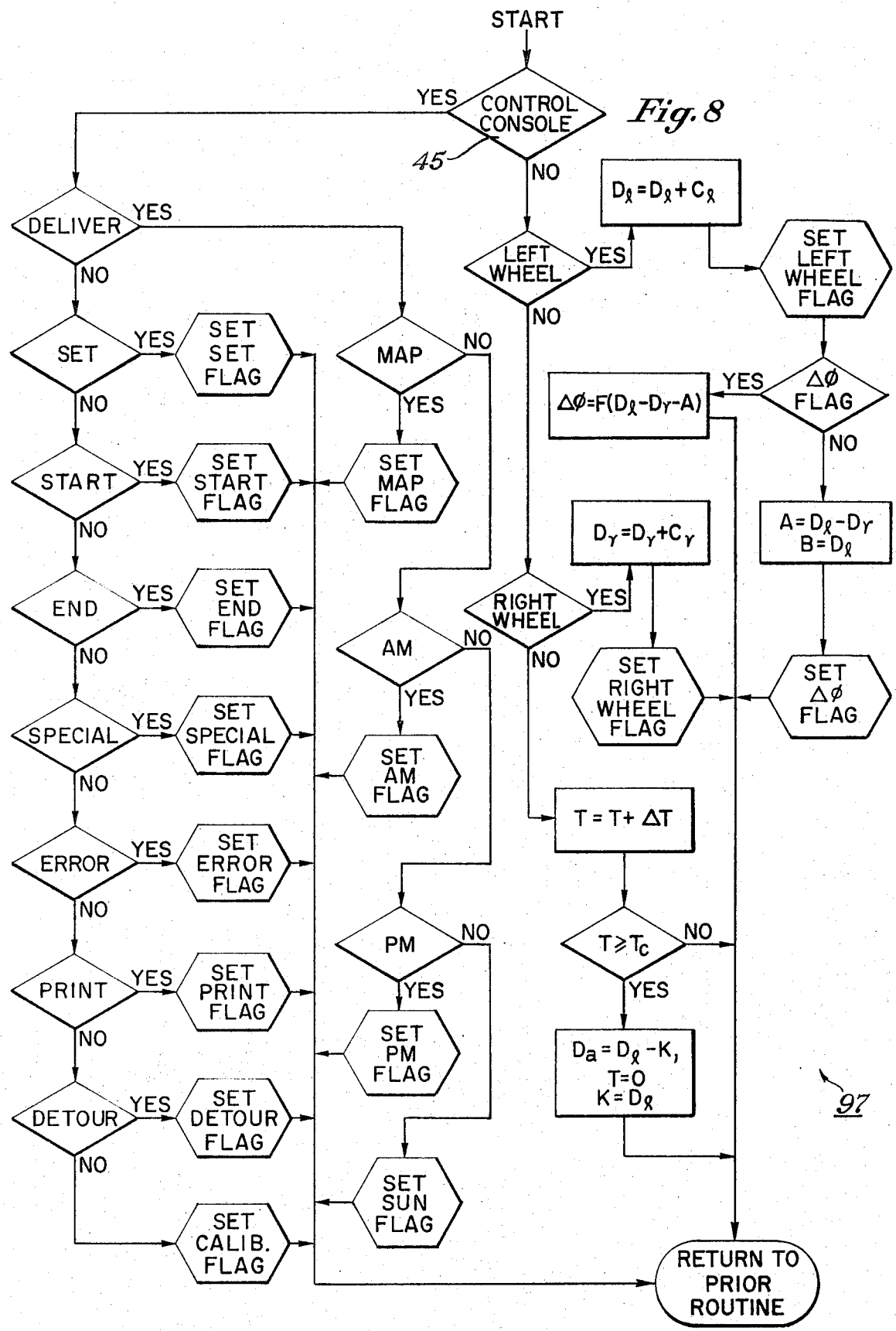
FIG. 8 is a flow diagram of the interrupt input routine of FIG. 6.

The interrupt input routine, as illustrated in FIG. 8, interrupts the programmer-computer means 25 any time an input signal arrives; as from the real time clock, a wheel sensor, or a button being pushed on the control display console 45. The programmer-computer means 25 is programmed to suspend whatever it may be doing at the moment, jump over to the interrupt input routine 97 and find out what produced the interrupt, or interrupt signal; take the appropriate action or set the appropriate flag; and return to the prior routine—all in less than a millisecond; for example, a few microseconds.

Referring to FIG. 8, the interrupt input routine 97 goes through a number of tests to find out what condition produced the interrupt signal. The first test asks whether the interrupt is from the control display console 45. If the signal is not from the control display console 45 then it has to be from the left wheel, from the right wheel, or from the real time clock, because these are the only three things that interrupt the programmer-computer besides the control panel. Accordingly, the interrupt input routine 97 interrogates whether or not the interrupt is from the left wheel. If the decision is no it proceeds to interrogate if the interrupt is from the right wheel. If the decision is no then it proceeds to the real time clock; since, by the process of elimination, this is the only choice left. The real time clock is not used in mapping. It is used for the timing in calculating speed and the amount of lead distance that is employed for generating the respective first and second signals to indicate to throw to the left or throw to the right. Expressed otherwise, a variable amount of lead distance is given depending on the speed of the vehicle. For example, if the vehicle is going at a creep speed, a throw signal will come exactly even with the front door of the house. If the vehicle is traveling at a speed of 20 mph, the signal will probably come at about 30 feet before the front door. The real time clock is, in effect, simply an oscillator to give the computer a pulse every small fraction of a second. The program 91, by knowing the time interval between pulses can compute time by adding the pulses and multiplying by the time interval to afford a basis for keeping track of real time.

If one interrogation of the control display console 45, a yes is obtained; the interrupt input routine interrogates each of the switches. Did someone press the DELIVER button, the SET button, the START button, or just what button It checks every button until it finds one that has been activated. When it finds a button that has been activated it simply sets a flag and passes on. To set a flag is simply a convenient way of expressing an action equivalent to putting an $x$ under a certain column for a certain condition that came up. Some time later the programmer-computer means 25 will check to see if there is an $x$ in the column by checking to see whether or not a flag has been raised. Once the flag is set the interrupt input routine then returns to the prior routine, whatever it was, as indicated. If upon interrogation of the DELIVER button, the decision is yes, the interrupt input routine examines to see whether or not the mapping mode has been activated. If the MAP button has been activated, a map flag is set and the programmer-computer means returns to the prior routine. If the answer to the MAP interrogation is no, the routine interrogates the AM switch to see if a morning edition is to be delivered. If the interrogation for whether or not the morning edition is to be delivered yields an answer of yes, the AM flag is set and exit is made. If the answer is no, the interrupt input routine then interrogates the PM switch. If the answer is yes, the PM flag is set and exit is made. If no, the Sunday flag is set, since that is the only other possibility.

If the interrogation of the left wheel indicates yes, the programmer-computer means 25 immediately calculates a new distance for that wheel. The distance $D_1$ is the distance traveled for that wheel since it was last initialized and set to zero. $C_1$ is the calibration factor for the left wheel. That is, it is the distance traveled per signal for that wheel, so the routine takes the old value of $D_1$ and simply adds to it the calibration factor to indicate how much further vehicle 13 has traveled. There is no multiplication, merely addition, or simply counting. The left wheel flag is set and another flag referred to as the turn differential flag, $\alpha\phi$, is interrogated. If the $\Delta\phi$ flag is set, it means that the programmer-computer means 25 is in the process of measuring or looking for a turn, since it is picking up a differential angle. If so, a new differential angle, $\Delta\phi$, is calculated. The term F is the factor for calculating the angle from the differential distance as delineated hereinbefore and A is the differential distance at the beginning of the calculation of $\Delta\phi$. If no flag is set, the routine sets a flag because it wants to be calculating the differential angle. Consequently, if the answer to the interrogation of the $\Delta\phi$ flag was no, the value of $A$ is given as $D_1-D_r$ and the value of B is changed to $D_1$. The $\Delta\phi$ may not be used before it is reset and a new flag raised. If the left wheel afforded the interrupt, the routine calculates the new left wheel distance and the new $\Delta\phi$, sets the left wheel flag, and then returns to the prior routine.

If the right wheel caused the interrupt, the new right wheel distance is calculated and exit is made similarly. If the interrupt was from the real time clock, the $T$ is changed to the old time plus the $\Delta T$, where $\Delta T$ is the increment of time per unit of interrupt from the real time clock. The routine then checks the time, $T$, to see if it is equal to or greater than $T_c$, the amount of lead time which has been set into the data. Generally, about one second has been found satisfactory for the lead time. If $T$ has not exceeded $T_c$, the interrupt input routine simply returns to the prior routine. If on the other hand, the time is equal to or exceeds the desired lead time, the interrupt input routine resets the time count $T$ to zero and calculates a lead distance, $D_a$, that is equal to the current value of the left wheel distance $D_1-K$, where $K$ is the distance of the left wheel when the time count was last started. So if there is an interval of one second, the distance between the left wheel distance now and what it was one second ago in effect reveals how far has been traveled in one second and that is the amount of distance to be subtracted later on to generate the signal for making throws in the delivery mode. Each time the routine reaches the time lead $T_c$, the time count is restarted and the value of $K$ is recalculated to the current value for the left wheel distance over the time interval. The $D_a$ is available for any one of the other routines.

Before mapping a route segment it is advisable to calibrate the respective distance measuring means 19. To calibrate the distance measuring means 19, the driver sets the distance of the marked calibration course on the lever wheel switches that serve as the distance setting means, as indicated hereinbefore. He presses the CALIBRATE switch. He presses the SET switch. The ready indicator will come on after the system has initialized. The driver presses the START button when he arrives at the beginning mark of the course. The driver drives the calibration course at a speed of 20 to 25 mph; preferably 5 to 10 mph if calibrating prior to mapping. He presses the END switch when he is at the end marked for the course. The system automatically calculates the calibration factors and stores them for use in connection with the respective routines as described hereinafter.

Figure 10:
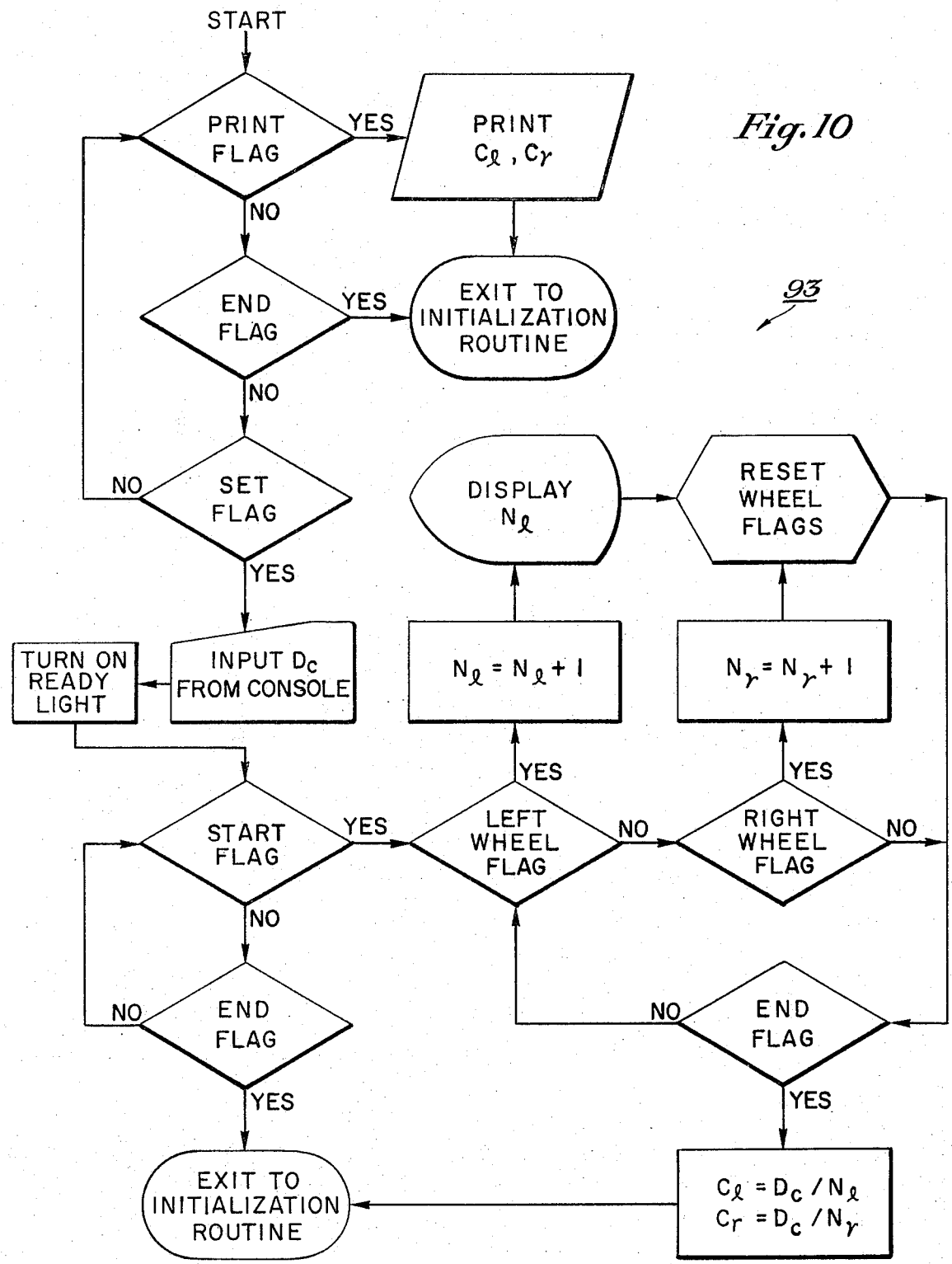
FIG. 10 is a flow diagram of the calibration routine of FIG. 6.

When the CALIBRATE (CALIB.) button has been pushed, it causes the ARCS operating program to go from the initialization routine 90 into the calibration routine 93, as for making a calibration run before mapping a route segment or delivering newspapers. Referring to FIG. 10, the calibration routine first looks for some other command that it will accept; to print, for example. The operator depresses a PRINT button on the control console 45 to effect a print command. If the print flag is raised such that the decision is yes when interrogated, the values of the calibration factors $C_l$ and $C_r$ are printed out and exit is made to the initialization routine. The print out of the calibration factors is primarily for inspection purposes such that their value can be checked to see if reasonable. If the print button has not been pushed, the calibration routine looks for the end flag to see if the END button has been pushed. Regardless of what the program has done, the routine can always end it responsive to depression of the END button to raise the end flag. If the answer is yes, the exit is made to the initialization routine. If not, interrogation is made of the set flag, which is raised by depressing the red SET button on the control console 45. The SET button is depressed when in the calibrate or map mode to cause the program to read in and accept the numbers that have been set up on the lever wheel switches. If the program is in the calibration routine, the numbers would be set in the lever wheel switches to indicate actual physical distance of the calibration course over which the vehicle is to be driven; for example, 500 feet. That would be the input $D_c$ from the console. When this has been accepted, the ready light is turned on but no further action is taken, except that the calibration routine simply looks for a start flag or an end flag. If the answer is no in both instances, it continues to circle and look for one or the other. When the driver is ready to start a calibration run, he depresses the START button, and a start flag is raised. Thus, the answer to the interrogation is yes, and the calibration routine starts accepting wheel counts for the left and right wheels while simultaneously looking for an end flag. The routine checks first to see if a count is obtained from the left wheel. If not, it checks to see if one is obtained from the right wheel. If from neither it checks to see if an end flag has been raised. Thus, the routine stays in a tight loop until one of the events occurs. If the left wheel flag is raised, the number of wheel counts $N_l$ from the left wheel is equal to the old value (which will be zero the first time through) plus 1. In measuring distance counts, the display of the wheel distance or counts is routinely made on the Nixie tubes on the control display console 45. Then the wheel flags are reset, in this case, only the left one. Again the loop is made to examine for an end flag. If there is no left wheel flag, a check is made for a right wheel flag. If a right wheel flag is obtained, the routine advances $N_r$ of the right wheel count by one, resets the flag and loops back around looking for more flags, either the left wheel, right wheel or end flag. When the driver gets to the end of his marked course, he presses the END button. When the answer to the end flag interrogation is yes, the calibration factor $C_l$ and $C_r$ are calculated by dividing the distance $D_c$ by the number of counts for the respective wheels, $n_l$ and $N_r$. The calibration factor $C_l$ and $C_r$ are stored and exit is made to the initialization routine.

Figure 11:
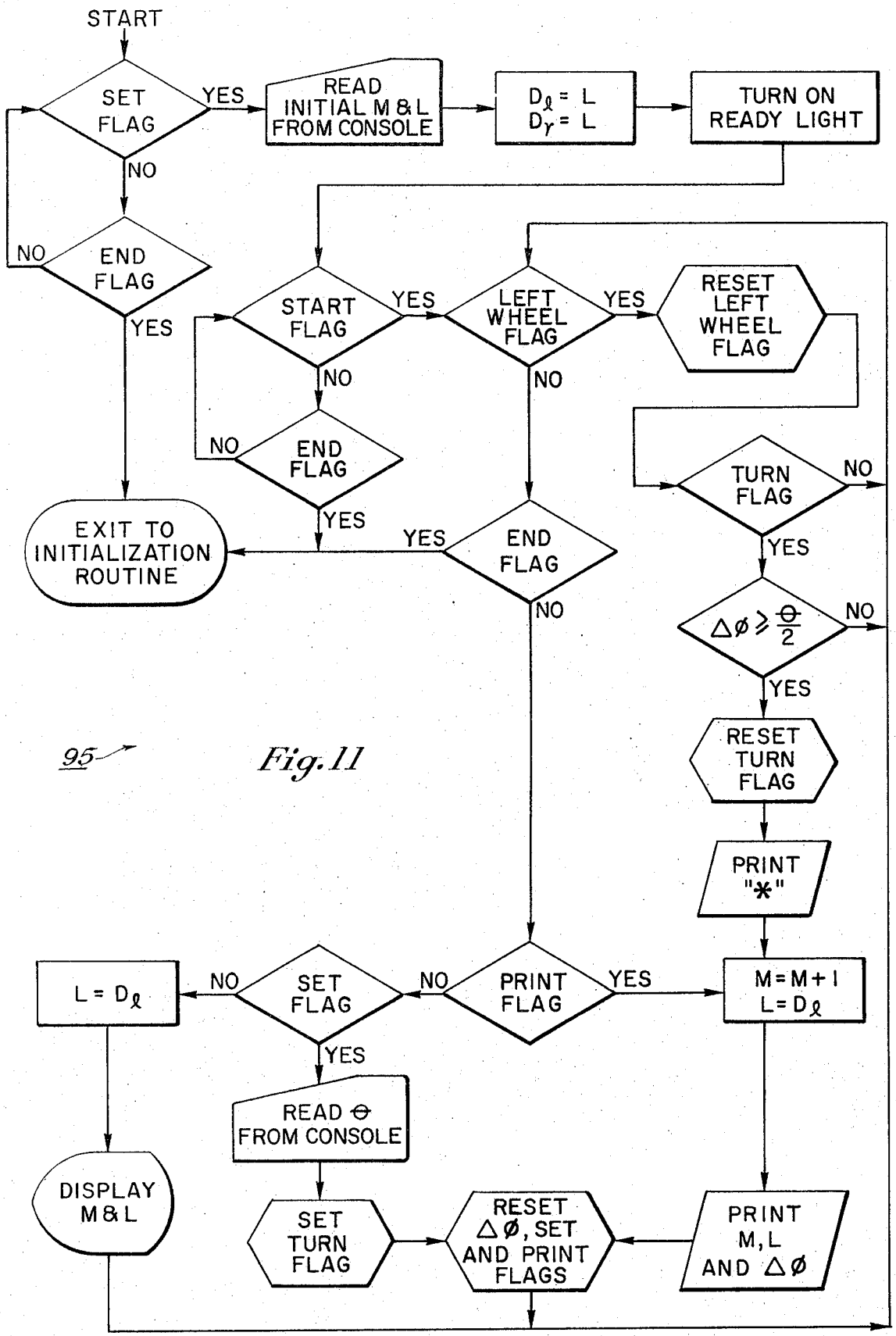
FIG. 11 is a flow diagram of the mapping routine of FIG. 6.

As the driver proceeds over a route for the first time, he or another operator will operate the vehicle-mounted equipment 15 in the mapping mode employing the mapping routine illustrated in FIG. 11. As indicated hereinbefore, a route is structured into segments for mapping. After a good calibration, the vehicle is driven to the beginning of a segment for mapping. The selector switch is set on MAP, and the programmer-computer means 25 turned on. The starting line number and distance are set on the lever wheel switches. The SET button is depressed. After ready light comes on, the START switch is depressed. The route segment is traversed slowly. Each time it is desired to record the location of something, whatever it is, whether an action point for delivery of an article to the house or for a turn, the operator simply depresses the PRINT button. Depression of the print button causes the current distance to be printed out along with a sequence number or entry number, M. The number M is a sequence number to assist in correlating the notes that are being taken with the entries, for example a house number, if it is a house. After the mapping mode has been selected, the mapping routine, FIG. 11, looks for some further indication from the control console; for example, for someone to raise the set flag or the end flag. If the set flag is up, it indicates that an initial value of the sequence number M and the distance along the route L have been set up. Normally, this would start with 1 and 0, but if the mapping was discontinued in the middle of a route segment and it was desired to pick up where it was discontinued, the operator may make a note of the numbers for M and L and set them in to begin at this point on the route segmment again. The initial value of L from the console 45 is set into the wheel distances such that $D_l$ and $D_r$ are made equal to L, the distance along the segment. The ready light is turned on to signal that the values have been accepted and the routine is ready for the driver to depress the START button and thereby raise the start flag. When the start flag appears, the program goes into a loop, looking for either the left wheel flag, the end flag, print flag, or set flag. If neither of the flags are found, the value of M and L are displayed where L is equal to $D_l$ and the routine returns to continue the loop interrogation. Assume then that a left wheel flag interrogation is answered yes, the mapping routine then resets the left wheel flag and interrogates for a turn flag. A turn flag will have been set if the program is in the process of mapping a turn. If a turn is not being mapped, the routine returns to the left wheel flag and continues in the loop until a flag is raised. If a set flag is raised, it indicates that the driver wants to map a turn. With the system operating in the map mode, the operator simply sets the estimated angle of the turn, say 90°, in the left wheel bank of lever wheel switches on the control display console 45, FIG. 5. It does not matter whether the turn is to the left or to the right. The operator presses the SET switch before starting the turn. The mapping routine reads in the expected number of degrees. The program then looks for the distance at which one-half of the turn has been negotiated. That is, the mapping routine reads the angle $\theta$ from the console 45 and sets the turn flag. The mapping routine resets the $\Delta\phi$ flag, from the interrupt input routine. The angle $\Delta\phi$ is being calculated all the time, whether it is being used or not. At this point, the accumulation of the calculated angle $\Delta\phi$ is started over again. Simultaneously, the set flag is reset. Similarly, the print flag is reset, whether it has been previously set or not. The routine then returns to the loop looking for the respective left wheel flag, end flag, print flag or set flag. If the turn flag is set as it will have been at this point, the locating and printing of the midpoint of the turn is automatic. Each time a left wheel flag is obtained during the process of mapping a turn, the turn flag is set. The mapping routine then compares $\Delta\phi$ to $\theta/2$, half of the expected angle. If $\Delta\phi$ is less than $\theta/2$, the mapping routine reenters the loop, and looks for more flags. Finally, though, enough turn will be executed such that $\Delta\phi$ is equal to or greater than $\theta/2$, such that a yes will be answered when interrogated. The mapping routine rests the turn flag and prints an "*". The "*" simply signals that this is the midpoint, of a half value, of the turn. The mapping routine then effects printing of the sequence number $M$, that is 1 greater than the previous one; the distance, or location, $L$ at which the midpoint occurred; and the angle $\Delta\phi$ as one-half the angle of the controlled turn. The printed value of $\Delta\phi$ is preceded by a positive or negative sign to indicate the sense, or direction, of the turn. The turn analysis means calculates the sign automatically, as indicated hereinbefore. Any time the routine goes through the cycle without counting and finding any kind of a flag set, the distance L and the sequence number M are displayed on the control disolay console 45. The loop is traversed by the mapping routine so rapidly that the display appears to be a continuous display.

The above procedure is applied only to controlled turns. Uncontrolled turns are defined simply by recording the approximate beginning and ending distances and, where appropriate, the direction of the turn. The mark of the uncontrolled turn is the 0° of turn read, even though a turn is indicated by its code number. For checking for unauthorized turn, only the absolute value of the turn is monitored.

As the vehicle is driven along the route, each street address and potential receiver for a newspaper, circular, or the like, is denoted by a respective action point. Each respective action point and the street address are correlated as described later hereinafter for use in the Files A and B of the central computer system means 17. Also encoded onto the tape at each respective action point is a code designating the direction of throw. Moreover, the lineal distance from the initiation point is automatically and simultaneously recorded with the action point, the distances recorded to the nearest foot and the cumulative distance variation is not allowed to exceed 10 feet. In listing all potential action points, the driver and the mapping routine operate specifically as follows.

To deonte a particular delivery point, such as a street address, the operator presses the print button when the vehicle is even with it. That sets the print flag. Thus, when the mapping routine interrogates the print flag and the answer is yes, the mapping routine then proceeds to equate M with old value of $M$ plus 1 and $L$ with $D_1$. The mapping routine then prints the value of $M$, $L$ and $\Delta\phi$. It then proceeds to reset $\Delta\phi$, and the set and print flags and reenter the loop. Whether the vehicle is mapping a turn or not, each time a location is recorded, the number of degrees that have been turned since the last recording are also printed.

When traversal of the route segment in the mapping mode is finished, the master route segment signature containing all of the action points; with their entries of information, including both the route definition portion and the receiver location portion; is manually correlated with the street addresses and subscriber data and key punched onto cards. The data are then read into the central computer 81 by the card reader included in the computer input means 83 and arranged by the programmed central computer 81 into Files A and B in the computer storage means 85. File A contains the control locations or turns that define the particular route segment, or comprise the route definition portion of the master route segment signature. File B contains a list of current and potential subscriber locations and is maintained up to date by suitable information through the typewriter terminal of the computer input means 83. An additional piece of information that is incorporated in File B is the location of the immediately adjacent action point both forward and backward and the respective pointers, or arrows, indicating whether it is forward or backward thereof. As indicated hereinbefore, this facilitates making corrections automatically by the computer as the information is typed thereinto from the IBM 2741 typewriter terminal.

After an operator has typed in a change in File B, the 1130 computer searches through the numbers and names to locate the address; stops; makes the change; and types out the current information. The operator compares the typed out current information with the information originally had. If there is a correction, the operator puts in the correction and again compares the typed out information. To keep the program for the IBM 1130 computer simple, it has been found advisable to simply have the operator look at a master map to determine whether a given address is to the left or to the right and to put the code directly into the computer program File B. The correctness of that information is then checked when it is compared with File A showing the address and whether it was a throw left or throw right address.

Thereafter, when it is desired to write a carrier, or route tape, the following multiple step procedure is carried out employing conventional porgrams available from the supplier of the central computer. First, the route number is entered. Thereafter, an entry is read from the magnetic disc serving as the storage means. A check is made to see that the line indices are set; and, if they are not, the indices are set. This allows inputting, or writting in, no more than the number of lines of information that can be stored. For example, when the Tri-Data 4096 and the BIT 483 mini-computer are employed, a maximum of six entries are written into each block of information. Thus, the computer will check that the indices are set and if not, will set the indices. The entry called up from the magnetic disc serving as computer storage means 85 is interrogated as to whether or not the entry along a given route is a subscriber. If the answer is no, as indicated by all zeros in the "editions" three digits of the number; namely, the digits numbers 14–16, the computer returns to read the next entry from the disc, again checking for indices. On the other hand, if the answer to the interrogation is yes, the next step is to convert the data into a format compatible with the vehicle-mounted programmer-computer means 25. For example, ordinarily, a central computer system means employs extended binary coded digital information code (EBCDIC) whereas the programmer-computer means 25 employs American standard coded international information (ASCII). Thereafter, interrogation is made as to whether or not this is the last entry on the record. If the answer is no, the computer returns to read the next entry from the disc and repeats the cycle of operation. If the answer is yes, the information is then fed out through the read-out and write-in means 87 for being written into the carrier 21. Typical route segment action signature information engrafted onto the carrier 21 is illustrated for the respective action points A–F of FIG. 2, later hereinafer. After one or more route segment delivery signatures for the newspaper delivery ARCS have been written into the carrier 21, it is physically moved into the read-out and write-in means 23 in the vehicle 13. It has been found that as many as 10 or more route segments may be written into one carrier and delivery of a single edition easily effected, since the newspapers can be delivered while the vehicle is traveling at 15 to 30 mph through the respective neighborhoods. The vehicle 13 is loaded with the paper and, if unfolded, a preliminary run of folding is made to afford a supply of folded papers to the throwers in the right and left sides of the vehicle. The ADV equipment will do most of the work except for the actual throwing when the manual throwers are used. In particular, the drivers and throwers are relieved of the task of remembering where to turn and where to throw while rapidly traveling over a route. It is imperative that the driver of the vehicle follow the prescribed rules and avoid, where safe, unnecessary passing, turning and backing up, when the backing up is not in the route control instructions. If necessary to back up for more than 20 or 30 feet the vehicle-mounted apparatus 15 should be placed in the detour mode.

The driver turns the computer ON-OFF switch to the on position. The current route tape in the magnetic tape cartridge unit 39 is inserted in the upper slot of the equipment cabinet 41. If a cartridge is not inserted in the lower slot one must be inserted for the unit to operate. The LOCAL and AUTO switches are pressed and a check is made to see that the time clock in the interface unit is in the on position, and the other detailed start-up and pre-run checks performed. After power has been applied to the generator control panel and the system start-up sequence completed, the vehicle is driven to the initiation point 101, FIG. 2, with or without a preliminary calibration run.

It is not necessary to calibrate at the beginning of each operation, as indicated hereinbefore. However, a calibration run should be performed after air has been added to the tires or when the vehicle has an exceptionally heavy load.

The calibration routine is employed if a calibration run is made. The interrupt input routine operates as described hereinbefore. The main other routines used for operating over a previously mapped route segment are the route tape routine 103, FIG. 6, to select entries from the route tape; the service routine 105 to compare the vehicle location with the action locations indicated by the route tape entries; and the route signature routine 107 to determine whether the vehicle is following the proper route. The terminology "route tape" is employed here to mean the carrier 21 with its route segment action signature. The route signature routine is the routine which monitors for the route definition portion of the route signature.

The program is "interrupt" driven. By "interrupt" driven is meant that all program actions are originated by hardware interrupts from devices that interface with the programmer-computer means 25. Regardless of which routine may be operating, it remains in a right loop until an interrupt is generated by the switches on the control display console, the wheel sensors, or the real time clock. When an interrupt occurs, the program exits from the current routine to service the interrupt input routine, as indicated hereinbefore. The course of action for a given routine may then be affected by flags set by the interrupt input routine when the program again returns to the routine on which it was operating.

The driver is now prepared to make a delivery run. The driver selects the edition to be delivered; for example, AM, PM or Sunday. He presses the DELIVER switch. He sets the starting segment and distance on lever wheel switches; for example, "01-0000" starting the route at the initiation point. He presses the SET switch. The driver presses the PLAY switch on the audio tape player 57. If the first message is not the proper one, he rewinds or advances the tape player 57 as necessary to synchronize the audio tape with the vehicle position. The audio tape may be advanced one message at a time by pressing the START switch on the tape player 57. The ready indicator will come on after the proper data on the route tape have been located. The driver presses the START switch on the control console 45 when he has driven to the initiation point 101, shown as the START of the route in FIG. 2. The driver drives the route as instructed by audio instructions and the turn indicator lights on auxiliary panel 59 until the route has been completed or until interrupted by detour or error. The system will issue audio command as necessary for throws by giving audio oscillator signals to the throwers on the right and left side of the vehicle, respectively. The system will give an audio signal and light a special switch when a stop is to be made for special action such as an apartment, trailer court, or other special situation. When this occurs, the special procedure will be followed. This special procedure is given hereinafter. When the delivery is completed, the audio message will be given and the system will automatically rewind the route tape and end. The routines by which the respective steps are accomplished will be described later hereinafter.

When the special audio signal sounds and the SPECIAL switch lights up, the vehicle is stopped at the next apartment or building. After stopping the vehicle, the SPECIAL switch is pressed for printed instructions. A printed list will be given of the special instructions; for example, delivery of papers to the specific apartment numbers. Once the special action is completed the normal delivery is resumed without requiring any further action.

In the event an error is made, such as making an erroneous turn or failing to make a proper turn, an error signal is given. When the audio warning sounds and the ERROR switch lights up, the ERROR switch is pressed after the vehicle has been stopped. The system will print the message stating the type of error and giving the next location at which a recovery can be made. The vehicle is aligned with the indicated location, the START button is pressed and the operation continued normally. If the printed location is not suitable for recovery, the ERROR switch is pressed to obtain an alternate recovery location. This process may be repeated as necessary to obtain a location satisfactory to the driver.

In the event it is desired for detour from the route segment for some reason, the DETOUR switch is pressed at the point where departing from the defined route. The printer will print the segment distance and the next few entries. If the further delivery instructions for the obstructed portion of the route are desired the PRINT switch is pressed. Approximately six additional locations will be printed each time the PRINT switch is pressed. Papers are thrown under manual control until a recovery can be made at a recovery point. To recover, the driver presses the END switch, positions the vehicle 13 even with an identified location and follows the delivery procedure given hereinbefore.

Figure 12:
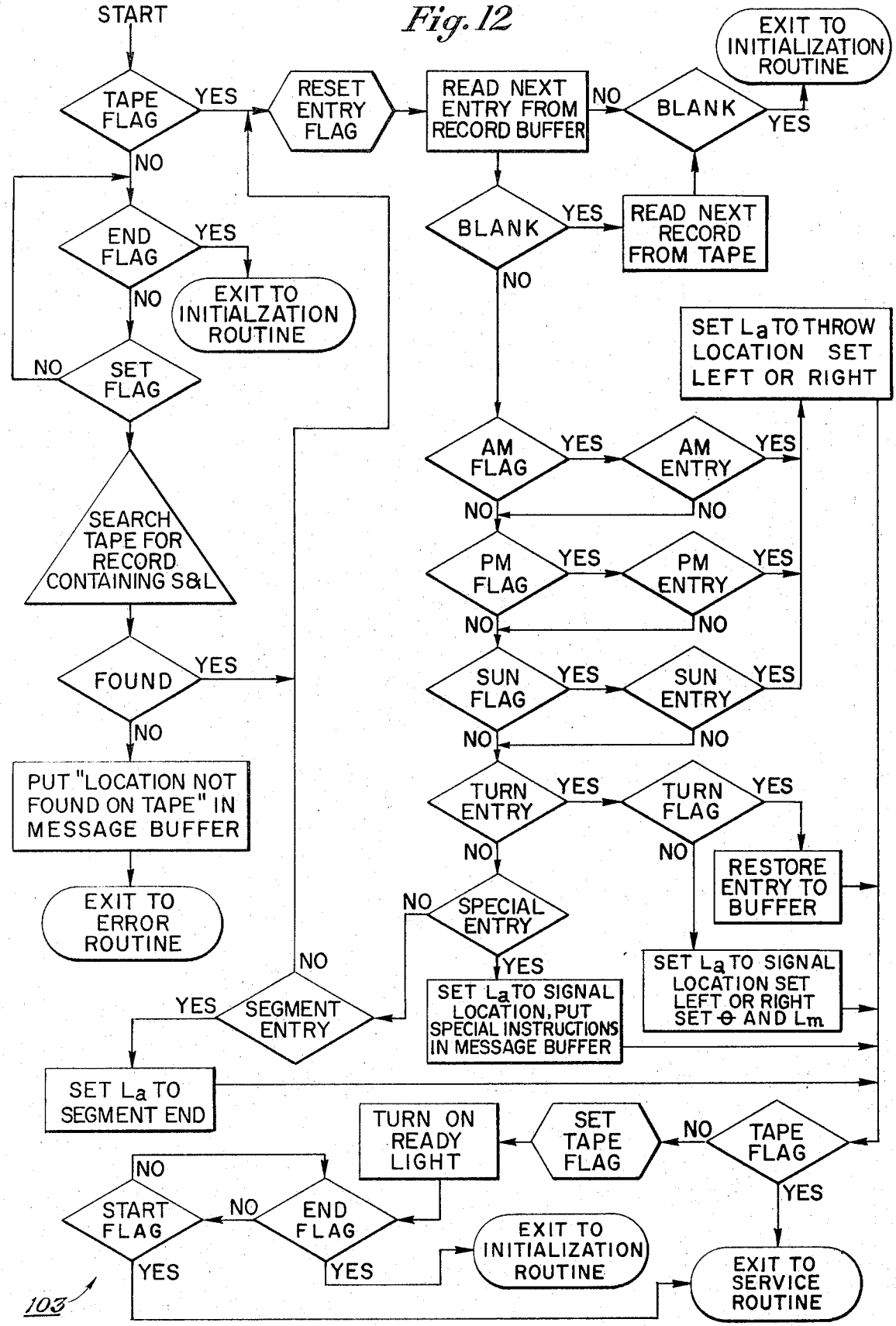
FIG. 12 is a flow diagram of the route tape routine of FIG. 6.

The programmer-computer means 25 uses the routines in the program 91 as follows. Referring to FIG. 12, as programmer-computer means 25 calls up, or enters, the route tape routine 103, a check is made to see if a tape flag has been set. The tapeflag simply tells whether this is the first time into this routine from the initialization routine. As can be seen from FIG. 6, the route tape routine may be entered from either the initialization routine 90, the error routine 109, or the route signature routine 107. Any time it is entered from the initialization routine 90, it is a fresh start and no tape flag will have been set. In that case, the answer to the interrogation is no and the routine interrogates whether or not an end flag or a set flag has been raised. If the routine gets a set flag, that indicates that the operation is set up with the initial segment number $S$ and distance $L$ within that segment on the lever wheel switches. Normally, this would be 1 and 0000. The route tape routine then searches the tape, indicated by the conventional triangle. If the routine cannot find an entry on the tape that matches, then an error is indicated. Most likely the operator called for something that was not supposed to be on the tape. If it is not found, the message "location not found on tape" is put in the message buffer and exit is made to the error routine 109. If it is found, then the routine comes up and resets an entry flag.

To understand the operation of the route tape routine, it is helpful to define the data structure of the route tape. For the prototype system, the route segment data were arranged into arbirary number of records, or blocks of information, each of which includes up to six entries. An individual entry within a record indicates the following fields: $L_a$, CODE, EDITION, SENSE, $\theta$, $L_m$, and COMMENT. $L_a$ is the distance at which the entry is to be acted upon; CODE defines a non-throw entry (turn, special, or end-of-segment entries); EDITION gives a combination of AM, PM and Sunday editions which defines a throw entry; SENSE indicates left or right; $\theta$ is the angle of the turn. The angle $\theta$ is set equal to zero to denote an uncontrolled turn. COMMENT gives the address for a throw entry, the new street name following a turn, or other explanatory information for other types of entry. The $\theta$ and $L_m$ fields are left blank in those entries where they are not required. The COMMENT field is always used for the special entry. For further types of entries, it is particularly useful for identification purposes in detour or error listings.

The purpos of the route tape routine is to find appropriate data on the route tape and to make the necessary settings for use in the service and the route signature routines. Thus, the route tape routine will have located the block of information having the entered location but will not have picked up the particular entry. The entry flag is reset. The next entry from the record buffer is read. Nothing is done with the entry, but it is read into the core storage, called the record buffer. The record buffer is simply a core memory in which the records from the tape are read and stored for use. Broadly, the route tape routine then determines whether the next entry with a value $L_a$ greater than L is an edition entry (AM, PM or Sunday), a turn entry, a special entry or an end-of-segment entry. After the determination is made, the route tape routine sets up appropriate parameters from the entry. To indicate that the system is ready to operate, the service routine turns on the ready light and then exits to the service routine when the start flag appears. Specifically, the routine reads one record into the memory, or record buffer. Assume this is to be the first entry to be used as the route is driven. So the instruction then is to read the next entry from the buffer. The routine checks to see if it is blank. The AM, PM and Sunday flags are raised as a result of the position of the SELECT switch on the control console 45, selected by the driver depending on whether he is delivering the morning, evening or Sunday edition. If the answer to the AM flag interrogation is no, the routine proceeds to the PM flag. Assume the PM flag has been raised. The routine follows the "yes" route to the PM entry, and thence to the block to "set $L_a$ to throw location, set left or right." $L_a$ is a value contained in that entry to define the action point and the routine sets it up to examine later and to record whether the delivery is to the left or right. The route tape routine 103 then prepares to go into the service routine where the distance traveled will be compared with the entry.

If neither of the edition flags were raised then there would be an interrogation of the turn entry. A raised turn flag has the same meaning as before — a turn in process. If not, the program sets up a signal location for the turn indicator by the entry, records whether it is left or right and sets the expected angle of the turn and the distance $L_m$. The distance $L_m$ is the expected midpoint of the turn. Once again the routine prepared to exit to the service routine. If there is no turn entry, the route tape routine 103 then interrogates if there is a special entry. If there is a special entry, the distance $L_a$ is set in to signal the location and special instructions are put in the message buffer. Exit is then made to the service routine 105.

If the answer is no all the way down, the routine is routed to the segment entry, which indicates an end of the segment. The distance $L_a$ to segment end is set and again exit is made to the service routine.

Before exit from the route tape routine 103 is completed, a check is made to see whether a tape flag has been set. If none has been set, a tape flag is set and a ready light turned on. This informs the operator that he can line up with the starting point and begin his traverse of the route segment, performing the actions, such as delivering the papers. The route tape routine 103 then watches for the start or the end flag. The start flag is an indication that the system is operational and exit is made to the service routine 105.

Figure 13:
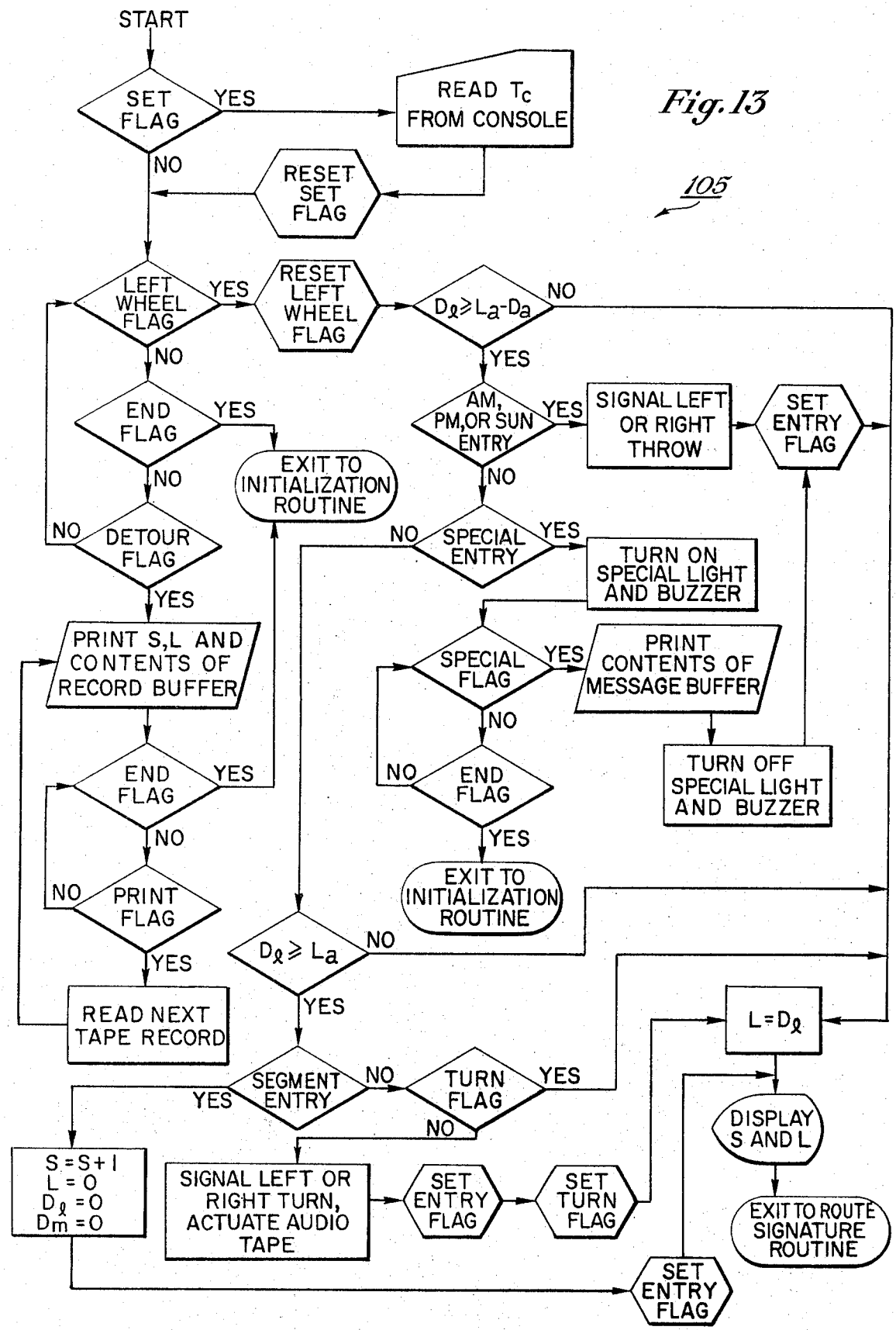
FIG. 13 is a flow diagram of the service routine of FIG. 6.

The service routine 105, FIG. 13, determines when an action point for a particular type of entry has been reached and then gives the necessary signal. Upon entry to the service routine, interrogation is made of a set flag. If the answer is yes it indicates that a new value of $T_c$ has been set into the lever wheel switch on the control console 45. As indicated earlier, $T_c$ may be, for example, 1 second. The value is read into the program from the control console 45 and the set flag is reset. Next the left wheel flag is interrogated. The routine watches for the left wheel flag, because the left wheel gives operational distance whiceis a primary one of the psuedo-polar coordinates for the action points.

If the interrogation of the left wheel flag is answered no, examination is made for an end flag. If an end flag is found, exit is made to the initialization routine. If there is no end flag, interrogation is made for a detour flag. If there is no detour flag, the service routine enters a tight loop looking for one of the three flags. If the answer to the interrogation for a detour flag is yes, S, L, and the current contents of the record buffer are printed; and the service routine then watches for an end flag or a print flag. Successive print flags cause additional records to be read into the record buffer and to be printed. The end flag causes exit to the initialization routine, similarly as indicated hereinbefore.

Assume the answer to the interrogation of the left wheel flag is yes. The left flag is reset. Each time a left wheel flag is obtained, check is made to see if the distance for signaling an action point has been reached. If so, the action is signaled. Specifically, the distance $D_1$ is compared to see if it is equal to or greater than the distance $L_a-D_a$, where $L_a$ is the distance at which the particular next action point is indicated, and $D_a$ is the lead distance calculated routinely back in the interrupt input routine. If the vehicle is not at the action point distance yet, the service routine 105 comes down to call the distance $L$ within the segment as being equal to the left wheel distance $D_1$. That information is displayed, along with the current segment number S; and exit is made to the route signature routine to check to see if the vehicle is still on course. If, on the other hand, $D_1$ is equal to or greater than $L_a-D_a$, then a check is made for the AM, PM or Sunday edition. If the answer is yes then the first or second signal is given immediately to effect a left or right throw. The entry flag is set, $L$ is indicated equal to $D_1$ and exit is made to the route signature routine.

If the answer to the AM, PM or SUN entry, or edition, is no; interrogation is made of the special entry block. If that interrogation is answered yes, a special light and buzzer are energized. At this point the service routine enters into a tight loop to check for a special flag or an end flag. If the driver presses the SPECIAL button in acknowledgement, then the service routine 105 receives a yes; and it prints out the contents of the message buffer. It then turns off the special light and buzzer; sets the entry flag; and exits to the route signature routine as before. If the answer to the interrogation of the special entry was no, the service routine compares $D_1$ with the distance of the action point $L_a$, the service routine exits to the route signature routine to check to see if the vehicle is on course, as indicated hereinbefore. If $D_1$ is equal to or greater than $L_a$, a check is made to see if there is a segment entry. If there is, the segment number S is set equal to S+1; and all other distances are reset to 0 to begin the raw segment. An entry flag is set, and exit is made to the route signature routine. As indicated, a plurality of ten or more route segments may be employed in a given route for a vehicle 13.

If the interrogation of the segment entry was no, the entry had to be a turn because all other possibilities had been eliminated. Check is made to see if the turn flag is set. If the answer is yes the service routine exits to the route signature routine as indicated hereinbefore. The first time through the turn flag may not be set. If not, a left or right turn is signalled, the tape recorder is actuated to play out one of the sequential messages which are recorded in the recorder in the auxiliary part of the system. The service routine 105 then sets the entry flag, sets the turn flag, sets $L=D_1$, displays the segment and distance S and $L$ and exits to the route signature routine 107.

Figure 14:
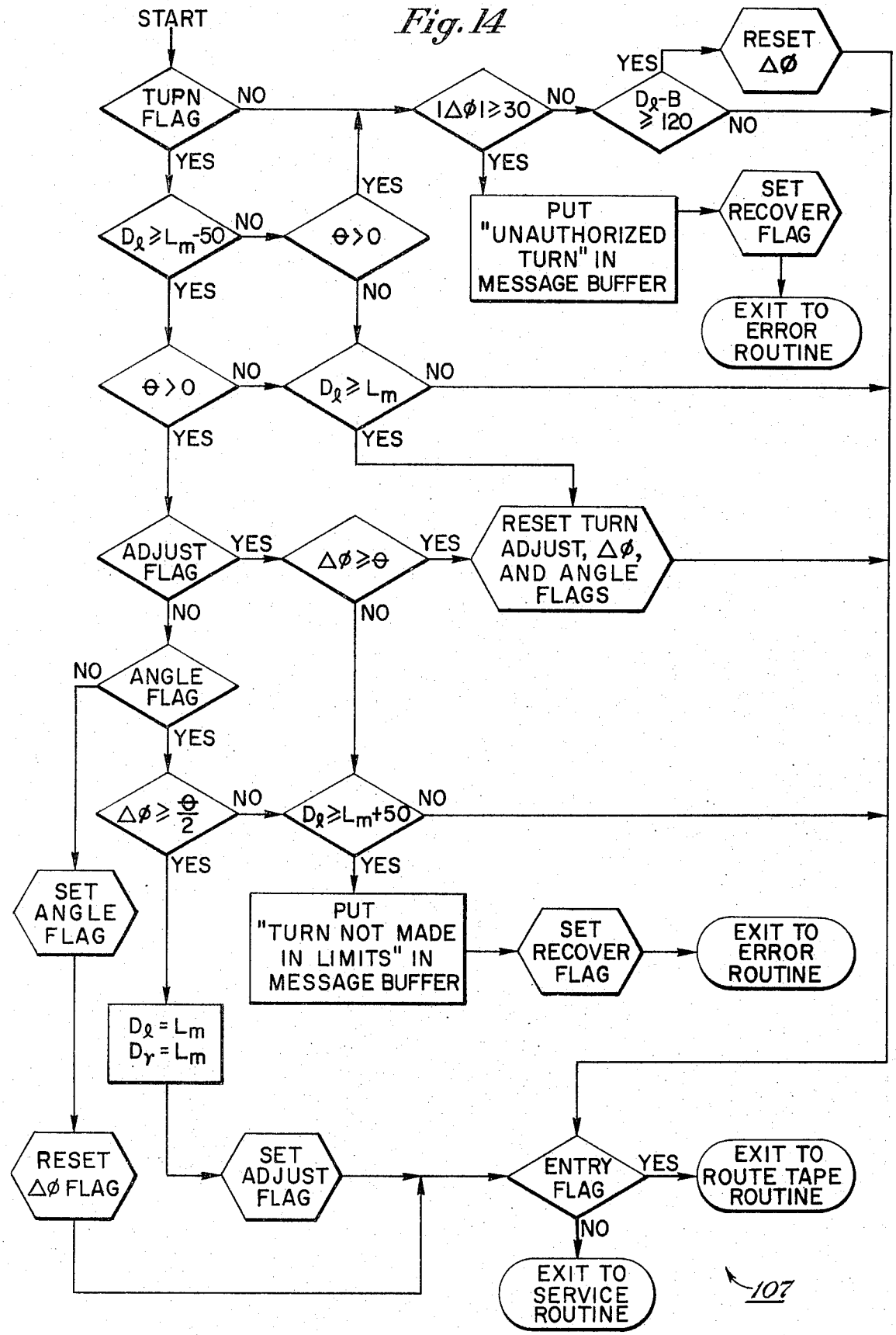
FIG. 14 is a flow diagram of the route signature routine of FIG. 6.

Referring to FIG. 14, the first action made by the route signature routine 107 is to check to see if a turn is supposed to be in process. If the answer to the interrogation is no, the angle $\Delta\phi$ is checked to see if it is greater than the turn error threshold; in this case, greater than or equal to 30°. If $\Delta\phi$ is less than 30°, then the distance $D_1-B$, where B is the left wheel distance at the beginning of the $\Delta\phi$ calculation, is checked to see if it is greater than or equal to the renewal distance for the auxiliary counters 120 feet as illustrated. If the answer is yes, $\Delta\phi$ is reset and the route signature routine checks the entry flag. If there is an entry flag it exits to the route tape routine 103. If there is no entry flag it exits to the service routine 105. If $D_1-B$ is less than 120 feet the $\Delta\phi$ flag is not reset but the route signature routine goes directly to the entry flag and thence exits to one of the other routines.

If, on the other hand, $\Delta\phi$ is equal to or greater than 30°, an "unauthorized turn" message is put in the message buffer. Next, the recover flag is set to tell the driver how to recover from the error and exit is made to the error routine 109.

Assume that a turn flag has been set such that the answer to the first interrogation is yes. The first test is to determine if the left wheel distance $D_1$ is within the predetermined distance of the expected midpoint of the turn. As illustrated, a check is made to see if $D_1$ is equal to or less than $L_m$-50, where the 50 feet is an arbitrary satisfactory distance. If the answer is no, then the vehicle should not be turning yet, so a check is made to see if the angle $\theta$ is greater than zero. If the answer is yes, the routine again checks $\Delta\phi$ for an unauthorized turn as described hereinbefore. If the angle $\theta$ is shown as zero that is arbitrarily an uncontrolled, or free turn, as indicated hereinbefore. With such a free turn, the degree of turn is not set in, since the driver will simply be following a curve in the road. Thus, if $\theta=0$, a check is made to see if the distance $D_1$ is less than or equal to $L_m$; normally, the expected midpoint of the turn, but it will be recalled that $L_m$ is the end of the turn for an uncontrolled turn. If the answer is no, the route signature routine 107 exits via the entry flag, as described hereinbefore. In this case there is no need to pick up a new entry, since the routine has not finished using this one yet, so exit would be to the service routine 105.

If the answer to the interrogation of whether $D_1$ is less than or equal to $L_m$-50 is yes and $\theta$ is greater than zero, the route signature routine 107 then checks the adjust flag to see if it has been set. The adjust flag is set only when we have reached the midpoint and synchronized or made an adjustment. Assume the adjust flag has not been set. Check is then made to see if the angle flag has been set. The angle flag is set as the 50 foot mark is passed going into the turn, that is 50 feet back from the midpoint of the turn. As indicated hereinbefore, this distance is arbitrary and can be decreased for increased sensitivity or increased for lesser sensitivity.

The first time through the angle flag would not have been set so the answer to the interrogation would be no. The angle flag is then set. The $\Delta\phi$ flag is then reset and the route signature routine goes to check the entry flag and exits to the indicated routine. As each additional left wheel flag is effected in the service routine 105 the same sequence of checks are made in the route signature routine 107. The next time through, however, the adjust flag will not have been set but the angle flag will have been set. Consequently, the route signature routine 107 interrogates whether $\Delta\phi$ is greater than or equal to $\theta/2$. If $\Delta\phi$ is less than $\theta/2$ the route signature routine 107 then interrogates whether $D_1$ is greater than $L_m+50$, to check if the vehicle has gone more than 50 feet past where half of the turn should have been effected. If not, the routine exits to make another cycle. Thus, the programmer-computer means 25 stays in the loop until one of the criteria are met for terminating the turn. For example, if the 50 foot mark has been exceeded without finding the midpoint, the vehicle is off the route in some way and has to be adjusted; for example, advising the driver that he did not make the required turn. Specifically, if the answer to interrogation is "$D_1$ is equal to or greater than $L_m+50$" is yes then the "turn not made in limits" message is put into the message buffer, the recover flag is set and exit is made to the error routine 109.

If, on the other hand, within ±50 feet of the expected midpoint $L_m$ the midpoint of the turn is encountered ($\Delta\phi \geq \theta/2$), the route signature routine 107 makes the adjustment, as a part of the continuing adaptive synchronization, or calibration, by setting the current value of the left wheel distance and the right wheel distance equal to the midpoint value of the turn; that is, it sets $D_1 = L_m$ and $D_r = L_m$.

It will be recalled that this is the adaptive synchronization aspect referred to hereinbefore. The adjust flag is set. The adjust flag reminds the routine that although the midpoint is reached, the entire controlled turn has not yet been negotiated. Exit is made to the service routine 105 and the programmer-computer means 25 stays in the loop. When the adjust flag is interrogated the next time through, however, the answer is yes so the interrogation is whether $\Delta\phi$ is equal to or greater than $\theta$; within an error of ±5°, for example. If $\Delta\phi$ is equal to or greater than $\theta$ then the route signature routine 107 is signaled that the turn has been completed satisfactorily. The routine 107 then resets the turn, the adjust, the $\Delta\phi$, and the angle flags and checks the entry flag before it exits to the appropriate routine.

If $\Delta\phi$ is still less than $\theta$, a check is made to see if the $D_1$ is greater than or equal to $L_m+50$. If $D_1$ is less than $L_m+50$, continued cycling is effected until one of the two conditions is met. If $D_1$ is equal to or greater than $L_m+50$, the "turn not made in limits" message is put into the message buffer, the recover flag is set and exit is made to the error routine.

The programmer-computer means 25 is sent to the error routine 109, FIG. 15, when an error condition is detected. The procedure is about the same regardless of what error effected entry into the error routine 109. The error routine 109 first turns on the error light and buzzer to indicate to the driver that an error has occurred. For details on the error, the driver may press the ERROR button on the control display console 45. Depression of the ERROR button causes the contents of the message buffer to be printed. The contents might indicate an unauthorized turn; a location not on the tape; or even a bad calibration factor, indicated back in the initialization routine 90. That is, as the program goes from the initialization routine 90 into either the mapping routine 95 or the route tape routine 107, the program 91 checks to see whether the current values of the calibration factors are within a credible range. If they are not a "bad calibration factor" message is put in the message buffer and the program comes into the error routine 109. Sometimes the driver will known immediately what the error was and will not even both to press the ERROR button, pushing the END button instead. Thus, if the interrogation of the end flag shows a yes, exit is made to the initialization routine 90. Otherwise, the error routine sits in a loop looking for the end flag or the error flag. Once the error flag is obtained, the error routine 109 effects printing of the contents of the message buffer and interrogates for a recover flag. If there is no recover flag, it exits to the initialization routine. In the case of a turn error, the recover flag will have been set. For recovery, the next entry is read from the record buffer, examined, and printed. This is repeated until a throw or special entry is found. The left and right wheel distances $D_1$ and $D_r$ are set equal to the entry distance $L_a$ for the throw or the special entry. The program then exits, completing the setting up of the parameters enroute. That is, the recover, turn, adjust, angle and $\Delta\phi$ flags are all reset, $L$ is set equal to $L_a$, $S$ and $L$ are displayed and the ready light turned on. If there is an end flag exit is made to the initialization routine. If not, a check is made for a start flag. After the parameters are set up the driver may, after aligning his vehicle with the location which has been printed, press the START button and continue operation. The reason a throw entry or special entry is selected is because they make better recovery points than do turn entries. Any time the driver does not like a particular recovery point, he may push the ERROR button again to effect a new distance $L_a$ for a new throw entry or special entry. After the start flag is raised, the entry is restored to the buffer, the tape flag is set and exit is made to the route tape routine to continue the route segment.

Assume that the driver has set up the controls and has the programmer-computer means 25 operating on the respective programs and routines described hereinbefore, the vehicle starts to traverse the route. At Point A in FIG. 2, the programmer-computer means 25 effects a second signal to effect a throw to the right. The second signal may be generated in response to an entry as follows:

0176010000000111 4800 BONNELL

Thus, the action point is designated by the series of numbers in combination with the address to form a unique identification. The first four digits are employed to denote the lineal distance from the initiation point 101: namely 176 feet. The first digit following the six indicates a throw left, or first signal if it is a 1 and the absence of a signal if it is a 0 as in the illustrated example. The next digit indicates a throw right signal if it is 1, as in the example. If it is a 0 there is no second signal generated. In the seventh digit, or the third one in the second group, the presence of a 1 indicates that a special signal is to be given. Since there is a 0 in the illustrated digit, no special signal will be given. A numeral 1 in the eighth digit, or the fourth one in the second group, indicates a left turn is to be executed. Where a 0 is present, as in the indicated example, no left turn is to be executed. In the ninth digit, or the fifth one in the second group, the presence of a numeral 1 indicates that a right turn is to be executed. In the illustrated example, the presence of a 0 indicates that no right turn is to be executed. In the tenth digit, or the sixth digit in the second group, the presence of the numeral 1 indicates the end of a segment. Since a 0 is present in the illustrated example, this is not the end of a segment.

The next three digits indicate the angle of the turn. The most frequently used turn is 90°. As illustrated, the example is neither a turn to the right nor to the left so the angle of the turn was 000. The last three digits of the number indicate the edition, if any, the prospective subscriber is to receive. The digits denote with respective 1's if the Sunday edition, the evening edition and the morning edition is to be delivered to the particular action location, or address. As illustrated, the subscriber at 4800 Bonnell, or position A in FIG. 2, takes all of the Sunday, evening and morning editions so the numeral 1 appears as all three digits. If 0 appeared at the first of the three digits it means the subscriber does not take the Sunday edition. Similarly, if a 0 appears as the second of the three digits it means he does not take the evening edition. If a 0 appears as the third of the three digits it means the subscriber does not take the morning edition.

Figure 2:
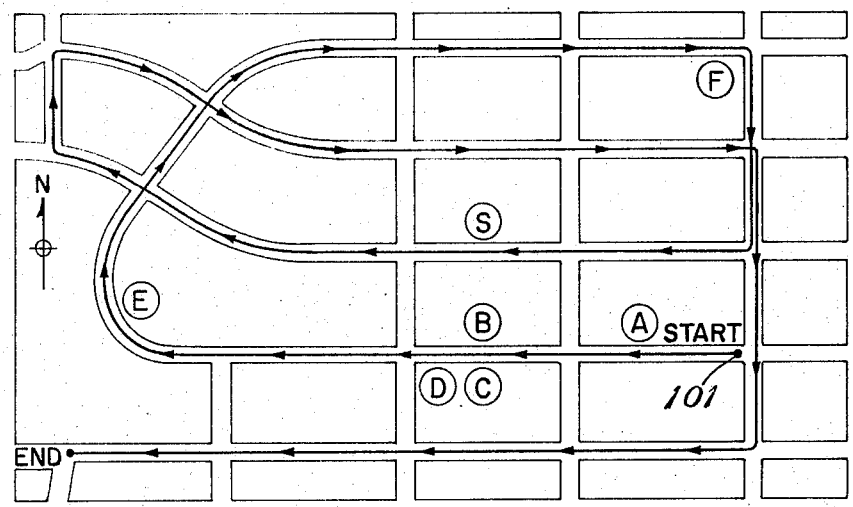
FIG. 2 is a partial plan view of a predetermined route segment.

If two subscribers occur at substantially the same lineal distance along the route, as illustrated in B and C of FIG. 2, a single entry could handle the effecting of the delivery signals if the subscribers took the same editions. To afford the desirable flexibility, however, the lineal distance is set apart by one foot such that two individual entries are effected as follows:

0491010000000011 4916 BONNELL, and 0492100000000101 4917 BONNELL

This flexibility allows indicating the different editions taken by the subscriber at B and the subscriber at C; yet, the 1 foot difference in distance can be accomodated by the system. The entry for a throw left at D is the same as shown above for C with the lineal distance and the editions correct for the subscriber at D. Each of the subscribers along the route segment will have their own individual entry similar to that indicated hereinbefore for entries A through C.

An uncontrolled turn to follow the street, as at Point E, is illustrated by an entry such as the following:

0938000010000111158 BELVIEW FENCELINE

In this entry, the lineal distance 0938 indicates the beginning of the turn. The numeral 1 in the turn right digit column indicates that the turn is to the right but the angle of the turn is shown as 000, the mark of an uncontrolled turn. Consequently, the unauthorized turn routine and the controlled turn routine are both suspended. The presence of the three numeral 1's in the editions column show that this turn is made regardless of whether a Sunday edition, an evening, or a morning edition is being delivered. The additional four digits, 1158 indicates that the expected end point of the turn occurs at a lineal distance of 1158 feet from the start 101, or 220 feet after the turn begins at 0938 feet. The name of the street and a description point then follow. For a controlled turn, as at F in FIG. 2, a typical entry would be as follows:

19470000100901112199 ELDRIGE, 2801 KILPATRICK

In this entry the first four digits 1947 is the point for signalling an up coming controlled turn. The additional, or last, four digits 2199 indicate the midpoint $L_m$ of the turn. If the turn were to the left, the numeral 1 would occur in the eighth digit instead of the ninth digit of the number. Again, the presence of the three 1's under the editions indicate that this controlled turn is made for all editions. A typical special entry, such as Point S in FIG. 2 might be as follows:

2568001000000100 VILLAGE APTS. 142, 144, 243, 245

The 1's in the special digit column and in the Sunday edition digit column indicate that the Sunday edition is to be delivered to apartments 142, 144, 243 and 245 of the Village Apts. For use with a different edition an additional entry might be as follows:

2568001000000010 VILLAGE APTS. 142, 143, 144, 243, 245 to indicate that the evening edition is to be delivered to apartments 142, 143, 144, 243 and 245 there.

Thus, the driver traverses the route in the vehicle and the respective first, second, third, fourth, fifth and sixth signals denoting respectively the throw left, throw right, special, turn left, turn right, and end-of-segment signals, are generated responsive to the properly placed unit digit in the six digits following the first four digits, which indicate the lineal distance along the predetermined route segment. The programmercomputer means 25 automatically follows its program and, with the previously discussed routines, effects the needed individual decisions, loops, etc. many thousands of times along each route segment. It is believed superfluous to discuss these thousands of individual and conventional computer operations, since they are clear from a consideration of the respective routines described hereinbefore. In any event, the driver is enabled to traverse the route segment regardless of whether he has been over the route segment before or not. Moreover, the signals are generated for effecting delivery of the papers; regardless of whether or not there is employed (1) fully automated equipment to operate in response to the signals alone; (2) in response to the signals with manual supervision to stop an otherwise automatic throw if unsafe; or (3) semi-automated equipment to throw or launch the paper responsive to manual depression of an operating switch if safe after a signal that is intelligible to the operator; or (4) manual throwers throw the papers safely in response to the respective signals as described hereinbefore.

When a route of a plurality of route segments is completed, the vehicle 13 is returned to be equipped for the next edition.

General

While proximity switches and lugs have been described hereinbefore for use in the distance measuring apparatus, any apparatus that provides signals compatible with the interface unit of the programmer-computer means 25 can be employed. For example, a fifth wheel, as described in the earlier filed co-pending application Ser. No. 52,553, is satisfactory.

While the data for the different entries have been given hereinbefore as it would appear on a print-out from the central computer means 17, different formats are employed for the different steps of information storage, use, and print-out. For example, for convenience and to save the time of the driver, the programmer-computer means 25 will convert the described columnar digital arrangement of information into a form readily intelligible to the driver. To illustrate, when a DETOUR button is depressed and a print-out obtained, the next several entries are printed with the information conveniently set out, as by "L" or "R" and the edition of the paper such as AM for a throw action, or "L" or "R" and an angle for a turn, instead of the columnar digits that would require careful and time-consuming reading by the driver. Thus, the format, or convention, is employed which facilitates use of the data by the using entity.

Convention other than that described hereinbefore may be employed in the turn analysis. For example, the sign of the angle may be used instead of a code number. When the sign is used, the sign of $\theta$ indicates the sense of the turn; as indicated, $\theta$ is negative for a left turn and positive for a right turn. For example, a right turn of 90° occurring 4751 feet from the beginning of segment number 2 may be defined by "2—4751+90." In any event, to avoid the possibility of turning wrongly, the programmercomputer means 25 converts the digits indication to sign indication for correlation with the sign that is automatically calculated by the turn analysis means 33.

While position numbers, or numbers employing digit columns, have been described, conventional numbers can be employed for the respective actions to be performed at the action points. For example, the number 1 can be employed to indicate throw left, a number 2 to indicate throw right, a number 3 to indicate special instructions, like indicating stop and drop a bundle for special supplemental action, a number 4 to indicate turn left, a number 5 to indicate turn right, or a number 6 to end the segment.

The use of adaptive synchronization to automatically and periodically bring the cumulative distance in the distance traveled signal from the left wheel counter into consonance with the accurate distance mapped to the particular action point has been described hereinbefore. Any other synchronization means for bringing the respective distance traveled signal and the mapped distance to the action point together at predetermined points may be employed. For example, in the earlier referenced co-pending application Ser. No. 52,553, the manual positioning, or synchronization, of the respective distances was described.

While the program has been broken down into eight routines, it could have been divided into any other arbitrary number, such as six, with different exiting to the respective routines employed as desired. Moreover, the respective routines and sub-routines of the program are described as carrying out a particular operation such as calculating the angle of turn $\Delta\phi$. Mathematically equivalent operations could be employed instead of the ones described. For example, instead of calculating and comparing $\Delta\phi$ as described, the controlled turn sub-routine could as easily calculate and compare differential distance $\Delta D$ traveled by the respective wheels in terms of the expected angle of turn $\theta$. To illustrate, as each successive count from the left wheel auxiliary counter is noted by the interrupt input routine 97, the programmer-computer means 25 could compute the new value of $\Delta D$ and compare it with $\pi\theta W/360$, the expected value of $\Delta D_c$ at the midpoint of a turn. The calculation and comparison will be repeated with each additional count from the left wheel. If the midpoint had not been reached at the previously described predetermined distance of the expected location the error signal would be given as described. After reaching the midpoint, the controlled turn sub-routine would compare the differential distance with $\pi\theta W/180$, the expected value of $\Delta D_c$ upon completion of the turn. A consideration of formulas (7) and (8) given hereinbefore indicates that this differential distance calculation is mathematically equivalent to the differential angle calculation described earlier hereinbefore.

It should be noted that the method of preparing the carrier 21, or the magnetic tape cartridge with the route tape therein, is immaterial provided it gives valid data in proper format. For example, the carrier may be prepared almost entirely by manual methods employing typewriter input means, or by highly sophisticated computer controlled systems.

If desired, certain manual operations described hereinbefore can be automated. For example, instead of using punched cards and the punched card reader portion of the computer input means 83, as described hereinbefore, the correlation of the data acquired manually and automatically during mapping may be put into the carrier 21 and automatically read therefrom into the central computer system means 17 via cmputer read-out and writein means 87. The data can be put into the carrier 21 during mapping by driving more slowly and typing the notes thereinto, or the notes can be manually taken and subsequently used to prepare another carrier tape with all of the data. The use of punched cards has been found to be easily correlated, convenient and advantageous to date.

Any other satisfactory computer could be employed as either the central computer 81 or the programmer-computer means 25 on vehicle 13, if desired. In fact, later models will employ programmer-computer means, such as a stripped alpha 16, available from Computer Automation, having a larger memory; for example, up to 100 entries instead of 6 referred to hereinbefore.

Moreover, the central computer 81 and the programmer-computer means 25 can be placed in mutual communication by suitable communication link, such as radio or radio-telephone, for facilitating traversal over a route segment that is predetermined by the central computer system means 17. For example, the programmercomputer means 25 can interrogate for and write out a route tape or print-out in response to information for a route segment from a given position to a destination.

The advantages of automatic route control for delivering newspapers are particularly dramatic because it enables a revolutionary distribution concept that would not otherwise be feasible. Cost effectiveness studies thus far indicate that distribution costs may be reduced by about one-third while improving subscriber service and eliminating the headaches of maintaining a large force of news carriers. It is to be noted, however, that many other types of applications may employ the automatic route control system advantageously. For example, a manual write-in means 52 is provided for data acquisition at a location specified by the control tape. The driver may use the manual write-in means 52, such as a typewriter terminal, or may set in a transaction code, the identification of the items involved, the number of items, the amount of money collected, and the like on lever wheel switches on the control display console 45. These data; along with other data, such as giving the location of the customer or identification from the control tape; can be automatically recorded on a secondary magnetic tape cartridge which later can be entered directly into a data processing system so that records may be prepared quickly and automatically, eliminating time consuming manual preparation of records. If desired, the message printer can produce, in duplicate, receipts, order acknowledgements or other documents appropriate to the transaction.

In some types of applications, an automatic route control system may pay off by reducing the number of vehicles and drivers required to cover a given territory. Drivers are fully interchangeable because they can drive a new route alone with virtually the same efficiency as an experienced driver. Highly personalized customer service is assured by the accurate and current tapes on the vehicle. Many of the benefits in the automatic route control system may be realized in public service applications. Of potential value to both commercial and public service operator is the ARCS' potential for driver training, for monitoring driver performance and for promoting safety. Coupled with a radio transmitter and/or alarm devices, ARCS can also serve as an anti-hijack device.

From the foregoing, it can be seen that this invention provides method and apparatus which satisfies all the objects delineated hereinbefore. In specific embodiments, this invention provides apparatus which has one or more of the specific desirable features not heretofore provided. Specifically, because of the vehicle-mounted apparatus, an unparalled variety of applications may make use of this invention. Moreover, the central computer system allows a continuous updating at a central point such as an office or the like; and frequent updating makes for dependable individualized customer service, while at the same time decreasing costs for traversing over predetermined route segments.

Although this invention has been described with a certain degree of particularity, it is understood that the present disclosure has been made only by way of example and that numerous changes in the details of construction and the combination and arrangement of parts; and, specifically, the ordering of the specific routines and program drivingly connected with the computer; may be resorted to without departing from the spirit and the scope of this invention.

What is claimed is:

1. Apparatus for facilitating effecting actions by at least one carried operator at closely spaced predesignated action points along a predetermined route segment, as in commercial and residential neighborhoods, comprising:
   a. a vehicle;
   b. a distance measuring apparatus connected with said vehicle and capable of generating a plurality of discrete signals, one for each increment of distance travelled by at least one predetermined wheel of said vehicle; said signals being adapted for summation into at least one distance travelled signal that is a function of the cumulative distance travelled by said vehicle at least from a predetermined initiation point;
   c. a carrier having thereon a route segment action signature containing accurate information as to said predesignated actions to be effected, said information comprising a plurality of respective action points correlated with respective distances along said predetermined route segment, and whether each said action is to be performed to the left or to the right with respect to the direction of travel of said vehicle proceeding along said predetermined route segment; said information being in read-out format that is compatible with an automatic programmer-computer means;
   d. read-out and write-in means drivingly connected with said carrier for reading its route segment action signature into an automatic programmer-computer means responsive to automatic orders from said automatic programmer-computer means;
   e. an automatic programmer-computer means disposed in said vehicle and connected with said distance measuring apparatus so as to be driven by said discrete signals therefrom, and drivingly connected with said read-out and write-in means and, hence, said carrier so as to effect advancement of said carrier; said programmer-computer means having a distance measuring routine for summing said discrete signals from said distance measuring apparatus for at least one distance travelled signal; said automatic programmer-computer means having switch means for responsively connecting the programmer-computer means with the distance measuring means and with said read-out and write-in means at an initiation point and being programmed such that, responsive to said distance travelled signals and to a coded action at respective action points in said route segment action signature on said carrier when said vehicle has traversed the indicated linear distance along said predetermined route segment to the respective said action point, said programmer-computer means generates respective first and second signals designating respective action locations at which an action is to be performed and whether said action is to be to the left or to the right;
   said automatic programmer-computer means also having calibration routine for maintaining below a predetermined maximum permissible error threshold cumulative variation between respective said distance travelled signals employed to effect respective said first and second signals at respective action points and the accurate distances thereto.

2. The apparatus of claim 1 wherein a first signal means is provided for translating said first and second signals from said programmer-computer means into a form that is intelligible to said operator.

3. The apparatus of claim 2 wherein said calibration routine comprises a sub-routine for correlatively bringing together the distance indicated on said route segment action signature on said carrier and the distance travelled signature at a predetermined action point.

4. The apparatus of claim 3 wherein said route segment action signature on said carrier also contains special instructions and route information to indicate to a vehicle driver the direction in which to proceed at points along said route; wherein there is provided a second signal means that is connected with said programmer-computer means for translating a third, fourth or fifth signal from said programmer-computer means into instructions appropriate to positions along said route and intelligible to the driver; said programmer-computer means being programmed such that it correlates the distance traveled signal from said distance measuring means with said route information, computes therefrom when special instructions are to be given and when said driver is to turn to the left or to the right at optional turn points and generates the indicated respective third, fourth and fifth signals.

5. The apparatus of claim 4, wherein said actions comprise delivering articles on the fly to closely spaced predesignated receivers, the articles not being rendered unuseable by being delivered on the fly; said vehicle is capable of carrying a substantial load of said articles; said route segment action signature is a route segment delivery signature; said plurality of action points include said predesignated receivers; and said first and second signals indicate if an article is to be delivered to the left or to the right.

6. The apparatus of claim 5 wherein said articles are newspapers that are to be thrown to subscribers.

7. The apparatus of claim 3 wherein said calibration routine comprises a sub-routine for substituting for said distance travelled signal at a predetermined action point an accurate distance signal, as contained on said route segment action signature and defining said action point.

8. The apparatus of claim 3 wherein said calibration routine includes:
 a. first sub-routine for automatically calculating a calibration factor for output signals from said wheel with which said distance measuring means is connected; and
 b. second sub-routine for automatically converting the output signals from said wheel with said calibration factor to a distance travelled signal.

9. The apparatus of claim 8 wherein there are two distance measuring apparata; said distance measuring apparata are connected, respectively, with a left and a right wheel of said vehicle and effect respective discrete signals responsive to the distance travelled by each said left and right wheel; and wherein said first sub-routine of said calibration routine automatically calculates a calibration factor for each of said left and right wheels of said vehicle and said second sub-routine automatically modifies the discrete signals from each said wheel by its respective said calibration factor to effect more nearly accurate distance travelled signals from the respective wheels.

10. The apparatus of claim 9 wherein said first sub-routine of said calibration routine includes a third sub-routine for accumulating a number of said discrete pulses over a predetermined distance travelled for each wheel, and a fourth sub-routine for dividing a predetermined distance travelled by the accumulated number of pulses to get a calibration factor for each said wheel.

11. The apparatus of claim 10 wherein a calibration apparatus is provided and includes a distance setting means for manually inserting a predetermined differential distance for a preliminary calibration run driving over a straight course; and wherein manual means are provided for operation by a driver of the vehicle to signal the beginning and the end of the straight course; and wherein said first sub-routine automatically calculates a preliminary calibration factor for each said left and right wheel of said vehicle from said preliminary driving of said predetermined distance over said straight course and responsive to operation of said calibration apparatus, including said distance setting means and said manual means signalling the beginning and end of said preliminary calibration run.

12. The apparatus of claim 11 wherein said first sub-routine includes adaptive calibration sub-routine for automatically calculating a new calibration factor for each of said left and right wheels of said vehicle at predetermined action points as said vehicle traverses said predetermined route segment and said new calibration factor is employed in storing a calibration factor for effecting the distance traveled signal from each said wheel.

13. The apparatus of claim 12 wherein said first sub-routine includes a summing means for averaging the previous calibration factor and said new calibration factor and storing an averaged calibration factor for automatically effecting the distance traveled signal from each said wheel.

14. The apparatus of claim 9 wherein said first sub-routine includes adaptive calibration sub-routine for automatically calculating a new calibration factor for each of said left and right wheels of said vehicle at predetermined action points as said vehicle traverses said predetermined route segment and said new calibration factor is employed in storing a calibration factor for effecting the distance traveled signal from each said wheel.

15. The apparatus of claim 8 wherein said first sub-routine includes adaptive calibration sub-routine for automatically calculating a new calibration factor for said wheel of said vehicle at predetermined action points as said vehicle traverses said predetermined route segment and said new calibration factor is employed in storing a calibration factor for effecting the distance traveled signal from said wheel.

16. Apparatus for facilitating effecting actions by at least one carried operator at closely spaced predesignated action points along a predetermined route segment, as in commercial and residential neighborhoods, comprising a central computer system means for preparing, maintaining up-to-date, and writing a route segment action signature containing a plurality of action points that are closely spaced and related to lineal distance along a predetermined route segment; and vehicle-mounted apparatus for traversing along a predetermined route segment and carrying out the respective actions at said plurality of action points, as designated by the up-to-date route segment action signature prepared by said central computer system means; said vehicle-mounted apparatus comprising:
 a. a vehicle;
 b. a distance measuring apparatus connected with said vehicle and capable of generating a plurality of discrete signals, one for each increment of distance travelled by at least one predetermined wheel of said vehicle; said signals being adapted for summation into at least one distance travelled signal that is a function of the cumulative distance travelled by said vehicle at least from a predetermined initiation point;
 c. a carrier for a route segment action signature containing accurate information as to said predesignated actions to be effected, said information comprising a plurality of respective action points correlated with respect to the distances along said predetermined route segment, and whether each said action is to be performed to the left or the right with respect to the direction of travel of said vehicle proceeding along said predetermined route segment; said information being in read-out format that is compatible with an automatic programmer-computer means;

d. read-out and write-in means drivingly connected with said carrier for reading its route segment action signature into an automatic programmer-computer means responsive to automatic orders from said automatic programmer-computer means;

e. an automatic programmer-computer means disposed in said vehicle and connected with said distance measuring apparatus so as to be driven by said discrete signals therefrom, and drivingly connected with said read-out and write-in means and, hence, said carrier so as to effect advancement of said carrier; said automatic programmer-computer means having distance measuring routine for summing said discrete signals from said distance measuring apparatus for a distance travelled signal; said automatic programmer-computer means having switch means for responsively connecting the programmer-computer means with said distance measuring apparatus and with said read-out and write-in means at an initiation point and being programmed such that, automatically responsive to said distance travelled signal and to a coded action at respective action points in said route segment action signature on said carrier when said vehicle has traversed the indicated lineal distance along said predetermined route to the respective said action points, said programmer-computer means generates respective first and second signals designating respective action locations at which an action is to be performed and whether said action is to be to the left or to the right; said automatic programmer-computer means also having calibration routine for maintaining below a predetermined maximum permissible error threshold cumulative variation between respective said distance travelled signals employed to effect respective said first and second signals at respective said action points and the accurate distances to said respective action points;

said central computer system means including, properly connected:

f. a central computer for effecting storage and retrieval of information for, and preparing therefrom, at least one route segment action signature for writing into said carrier;

g. computer input means connected with said central computer for putting into said computer information for producing said at least one route segment action signature, including information for a current list of said predesignated actions to be effected;

h. computer storage means connected with said central computer for storing said information;

i. computer read-out and write-in means connected with said central computer for writing into said carrier said route segment action signature; said route segment action signature including an action point for at least each location at which an action is to be performed and whether each said action is to be performed to the left or to the right with respect to the direction of travel along said route; said action points including coded information as to at least a unique identification of the action point, the action to be performed at the respective action point and the lineal distance along said predetermined route;

said carrier being physically movable into and from said central computer system means for writing thereon a current said route segment action signature; said carrier also being physically movable into and from said vehicle-mounted apparatus in communication with said automatic programmer-computer means in said vehicle for effecting operation of said vehicle-mounted apparatus in accordance with said current route segment action signature.

17. The apparatus of claim 16 wherein said information for preparing said route segment action signature comprises a master route segment signature that includes all potential action points and a current designation of action locations for said route segment action signature; and wherein said computer input means comprises first and second computer input means for storing respectively said master route segment signature and said current designation of action locations in said computer storage means.

18. The apparatus of claim 16 wherein said computer read-out and write-in means and said read-out and write-in means have both read-in and read-out capability such that either can read information optionally into and from a carrier; a manual write-in means is provided in said vehicle and connected with said programmer-computer means for data acquisition as said vehicle traverses said predetermined route segment; and a second carrier is provided for data acquisition.

19. The apparatus of claim 16 wherein said computer read-out and write-in means and said read-out and write-in means have both read-in and read-out capability such that either can read information optionally into and from said carrier; a manual write-in means is provided in said vehicle and connected with said programmer-computer means for designation of action points and the action to be performed thereat as said vehicle traverses a predetermined route segment; and said programmer-computer means is operable in a mapping mode to automatically calculate and cumulate correct distance traveled information from said distance measuring apparatus and to read into said carrier a master route segment signature comprising the information from said manual write-in means and the distance traveled at each respective action point as said vehicle traverses said predetermined route segment; and said computer read-out and write-in means is adapted to read said master route segment signature from said carrier and into said computer storage means for later use in preparing a route segment action signature.

20. The apparatus of claim 19 wherein there are two distance measuring apparata; said distance measuring apparata are connected, respectively, with a left and a right wheel of said vehicle and effect respective plurality of discrete signals responsive to the distance travelled by each said left and right wheel; said left and right wheels are laterally disposed transversely aligned wheels of said vehicle and said automatic programmercomputer means in said vehicle includes a turn analysis routine adapted to calculate direction and degrees of turn effected by differential distances travelled by respective said wheels and said master route segment signature comprises a mathematical model containing for each action point at least the identity thereof; including the cumulative distance in number of incremental distance units thereto expressed as a digital number; a code number indicating ther respective signal to be generated thereat; and any degrees and direction of turn to be made adjacent thereto.

21. The apparatus of claim 20 wherein an action point is indicated on said master route segment signature for each potential location wherein an action is to be performed along said predetermined route segment.

22. The apparatus of claim 21 wherein the information for preparing a current route segment action signature comprises said master route segment signature that includes all potential action points and the current designation of action locations for said route segment action signature; said central computer is programmed to modify said master route segment signature with said current designation of action locations to produce said current route segment action signature; and said current route segment action signature comprises a mathematical model containing for each current action point at least a digital identity thereof; including the cumulative distance in number of incremental distance units thereto expressed as a digital number; a code number indicating the respective signal to be generated thereat; whether or not said current action point is a control action point and any degrees and direction of turn to be made adjacent thereto.

23. The apparatus of claim 16 wherein said actions to be performed comprise delivering articles to predesignated receivers and said vehicle is capable of carrying a load of said articles.

24. The apparatus of claim 23 wherein said articles are newspapers.

25. The apparatus of claim 24 wherein said vehicle includes a folding machine for folding said newspapers in said vehicle.

26. Apparatus for facilitating effecting actions by at least one carried operator at closely spaced predesignated action points along a predetermined route segment, as in commercial and residential neighborhoods, comprising:
 a. a vehicle;
 b. a plurality of distance measuring apparata connected, respectively, with two laterally disposed wheels of said vehicle and capable of generating respective pluralities of discrete signals, one for each increment of respective distances travelled by respective said wheels; said signals being adapted for summation into respective distance travelled signals that are functions of the respective distances travelled by said wheels of said vehicle;
 c. a carrier having thereon a route segment action signature containing accurate information as to said predesignated actions to be effected, said information comprising a plurality of respective action points correlated with distances along said predetermined route segment, and whether each said action is to be performed to the left or the right with respect to the direction of travel of said vehicle proceeding along said predetermined route segment; said information being in read-out format that is compatible with an automatic programmer-computer means;
 d. read-out and write-in means drivingly connected with said carrier for reading its route segment action signature into an automatic programmer-computer means responsive to automatic orders from said automatic programmer-computer means;
 e. an automatic programmer-computer means disposed in said vehicle and connected with said distance measuring apparatus so as to be driven by said said discrete signals from one of said wheels, and drivingly connected with said read-out and write-in means and, hence, said carrier so as to effect advancement of said carrier; said programmer-computer means having distance measuring routine for summing said discrete signals from said distance measuring apparatus for respective distance travelled signals from said wheels; said programmer-computer means having switch means for responsively connecting the programmer-computer means with the distance measuring apparatus and with said read-out and write-in means at an initiation point and being programmed such that, automatically responsive to said distance travelled signals from a predetermined one of said wheels and to a coded action at respective action points in said route segment action signature on said carrier when said vehicle has traversed the indicated lineal distance along said predetermined route segment to the respective said action point, said programmer-computer means generates respective first and second signals designating respective action locations at which an action is to be performed and whether said action is to be to the left or to the right; said automatic programmer-computer means also having calibration routine for maintaining below a predetermined maximum permissible error threshold cumulative variation between respective said distance travelled signals employed to effect respective said first and second signals at respective action points and the accurate distances thereto; and said automatic programmer-computer means also having turn analysis routine adapted to calculate direction and degrees of turn effected by differential in distances travelled by respective said wheels.

27. The apparatus of claim 26 wherein a first signal means is provided for translating said first and second signals from said programmer-computer means into a form that is intelligible to said operator.

28. The apparatus of claim 27 wherein said route segment action signature on said carrier also contains special instructions and route information to indicate to a vehicle driver the direction in which to proceed at points along said route; wherein there is provided a second signal means that is connected with said programmer-computer means for translating a third, fourth or fifth signal from said programmer-computer means into instructions appropriate to positions along said route and intelligible to the driver; said programmer-computer means being programmed such that it correlates the distance traveled signal from said distance measuring means with said route information, computes therefrom when special instructions are to be given and when said driver is to turn to the left or to the right at optional turn points and generates the indicated respective third, fourth and fifth signals.

29. The apparatus of claim 26 wherein said turn analysis routine automatically calculates the direction of turn as a positive or negative angle and the degrees of turn in accordance with the formula:

$$\theta = 180 \, \Delta D / \pi W \tag{1}$$

where:
$\theta$ = the turn angle in degrees;
$\Delta D = D_1 - D_2$;
$D_1$ is the distance traveled by a first one of said wheels;
$d_2$ is the distance traveled by a second one of said wheels; and
$W$ is the width of the vehicle; $W$, $D_1$ and $D_2$ being in compatible units.

30. The apparatus of claim 29 wherein an output means is connected with said programmer-computer means for providing an output signal intelligible to the driver of said vehicle; said programmer-computer means is capable of generating a turn error signal if an incorrect turn is made and causing said output means to advise said driver of a turn error; an unauthorized turn routine is emplaced in said programmer-computer means; two respective auxiliary counters are connected with respective said wheels for accmulating respective distance traveled signals from each wheel; and said auxiliary counters are reset at frequent intervals such that cumulative turn error is never allowed to reach a magnitude greater than a predetermined turn error threshold that will effect generation of a spurious error signal.

31. The apparatus of claim 30 wherein said frequent intervals is determined by a preset distance traveled signal by one of said auxiliary counters; said programmer-computer means under the influence of said unauthorized turn routine compares the distance traveled by each said counter at the end of each respective interval; and if an incorrect direction and degrees of turn greater than said turn error threshold is indicated, said turn error signal is generated for said driver.

32. The apparatus of claim 31 wherein said output means comprises a print-out means and said programmer-computer means in accordance with said unauthorized turn routine is capable of giving said driver instructions as to how to best correct an erroneous turn.

33. The apparatus of claim 30 wherein a turn routine is employed in said programmer-computer means at predetermined action points at which controlled or uncontrolled turns are to be effected; and said turn routine suspends said unauthorized turn routine during said controlled or uncontrolled turns.

34. The apparatus of claim 33 wherein said turn routine comprises a controlled turn routine having reset sub-routine for resetting left and right wheel auxiliary counters to zero at a first distance before the midpoint of a controlled turn is reached in accordance with said route segment action signature; and wherein there are provided calculating and comparing sub-routine for automatically calculating and comparing new differential distances traveled by said wheels; said calculating and comparing sub-routine calculating a new differential distance at frequent and predetermined intervals and comparing the new $\Delta D$'s with $\Delta D_e$, the expected value of $\Delta D$ at the midpoint of said controlled turn, where $\Delta D_e$ is defined by $\pi \theta W / 360$, in which $W$ is said width said wheels are spaced apart and $\theta$ is the angle in degrees for said controlled turn, until said $\Delta D_e$ is reached and thereafter comparing said $\Delta D$'s with $\pi \theta W / 180$, the value of $\Delta D_c$ at the completion of said controlled turn, until said $\Delta D_c$ is reached and thereafter reinstating said unauthorized turn routine and simultaneously comparing the distance traveled signal from a reference one of said wheels with the lineal distance indicated by said route segment action signature to said $\Delta D_e$; said controlled turn routine effecting a missed-turn error signal if said $\Delta D_e$ is not reached within a predetermined second distance of said lineal distance to the expected midpoint of said controlled turn.

35. The apparatus of claim 29 wherein said distance measuring apparatus is connected with the front wheels of said vehicle.

36. The apparatus of claim 35 wherein said automatic programmer-computer means stores as the distance travelled signal for said vehicle the discrete signals from the front wheel nearest the center line of the roadway when said vehicle is proceeding normally along said predetermined route segment.

37. The apparatus of claim 29 wherein a speed calculation routine is provided for calculating a speed signal by automatically counting the number of pulses from one of said wheels per unit time.

38. The apparatus of claim 37 wherein a distance of throw sub-routine is employed to effect an indicated signal at a predetermined distance preceding a respective action point and said speed signal is employed to modify the distance preceding a respective action point at which an indicated signal is generated.

39. The apparatus of claim 26 wherein said distance measuring apparatus are connected with the front wheels of said vehicle.

40. Apparatus for facilitating traversal of a predetermined route segment by at least one carried operator comprising:
a. a source of route segment information for formulating a route segment action signature;
b. a vehicle;
c. a communication link communicating with said vehicle and said source of route segment information for carrying said route segment action signature to said vehicle;
d. a plurality of distance measuring apparata connected, respectively, with two laterally disposed wheels of said vehicle and capable of generating respective pluralities of discrete signals, one for each increment of distance travelled by respective said wheels; said signals being adapted for summation into respective distance travelled signals that are functions of the respective distances travelled by said wheels of said vehicle;
e. an automatic programmer-computer means disposed in said vehicle and connected with said distance measuring apparata so as to be driven by said distance travelled signals therefrom and said communication link; said programmer-computer means having distance measuring routine for summing said discrete signals from said distance measuring apparata for respective distance travelled signals;

said automatic programmer-computer means also having a calibration routine for maintaining below a predetermined maximum permissible error threshold cumulative variation between respective said distance travelled signals to control action points in said route segment action signature and the accurate distances thereto in accordance with said route segment action signature; said calibration routine including:
  i. first subroutine for automatically calculating the calibration factor for output signals from said wheels with which said distance measuring apparata are connected; and
  ii. second subroutine for automatically converting the output signals from said wheels with said calibration factor to respective distance travelled signals;

said automatic programmer-computer means also having a turn analysis routine adapted to calculate direction and degrees of turn effected by differential in distances travelled by respective said wheels; said turn analysis routine automatically calculating the direction of turn as a positive or negative angle and the degrees of turn in accordance with the formula: $\theta = 180 \Delta D/\pi W$ (1)

where:
$\theta$ = the turn angle in degrees;
$\Delta D = D_1 - D_2$;
$D_1$ is the distance travelled by a first one of said wheels;
$D_2$ is the distance travelled by a second one of said wheels;
$W$ is the width of the vehicle; $W$, $D_1$ and $D_2$ being in compatible units; and f. output means connected with said automatic programmer-computer means for translating said route segment action signature into a format intelligible to a driver of said vehicle and said operator such that said driver and said operator can traverse said route segment and effect said actions.

41. The apparatus of claim 40 wherein said source of route segment information comprises a central computer system means, and said communication link communicates between said central computer system means and said programmer-computer means in said vehicle.

42. The apparatus of claim 40 wherein said programmer-computer means is capable of generating a turn error signal if an incorrect turn is made and causing said output means to advise said driver of a turn error; an unauthorized turn routine is emplaced in said programmer-computer means; two respective auxiliary counters are connected with respective said wheels for accumulating respective distance traveled signals from each wheel; and said auxiliary counters are reset at frequent intervals such that cumulative turn error is never allowed to reach a magnitude greater than a predetermined turn error threshold that will effect generation of a spurious error signal; wherein there is provided a second signal means that is connected with said programmer-computer means for translating a third, fourth or fifth signal from said programmer-computer means into instructions appropriate to positions along said route and intelligible to the driver; said programmer-computer means being programmed such that it correlates the distance traveled signal for said vehicle with said route information, computes therefrom when special instructions are to be given and when said driver is to turn to the left or to the right at optional turn points and generates the indicated respective third, fourth and fifth signals.

43. The apparatus of claim 42 wherein a turn routine is employed in said programmer-computer means at predetermined action points at which controlled or uncontrolled turns are to be effected; and said turn routine suspends said unauthorized turn routine during said controlled or uncontrolled turns.

44. The apparatus of claim 43 wherein said turn routine comprises a controlled turn routine for checking that controlled turns are made at the proper location and an uncontrolled turn routine for allowing a proper gradual turn to follow said route segment without generating a turn error signal.

45. The apparatus of claim 44 wherein said automatic programmer-computer means includes:
  a. an initialization routine as defined in FIG. 7;
  b. an interrupt input routine as defined in FIG. 8;
  c. a calibration routine as defined in FIG. 10;
  d. a mapping routine as defined in FIG. 11;
  e. a route tape routine as defined in FIG. 12;
  f. a service routine as defined in FIG. 13;
  g. a route signature routine as defined in FIG. 14; and
  h. an error routine as defined in FIG. 15; and said routines are interrelated as defined in FIG. 6.

* * * * *

UNITED STATES PATENT OFFICE
CERTIFICATE OF CORRECTION

Patent No. 3,845,289     Dated October 29, 1974

Inventor(s) Robert L. French and Richard V. Holsinger

It is certified that error appears in the above-identified patent and that said Letters Patent are hereby corrected as shown below:

Richard V. Holsinger is added as co-inventor; the assignee is changed to Avcon, Inc.; in the Abstract, second column (col.), line 13, "the" is changed to ---a---; col. 1, line 6 and col. 7, line 26, the serial no. "52,533" is changed to ---52,553---; col. 1, line 18 and col. 2, line 5, "newspaper" is changed to ---newspapers---; col. 1, line 27, "may" (first occurrence) is deleted; col. 2, line 7, "expanded" is changed to ---expended---; col. 2, line 12, "a long" is changed to ---along---; col. 7, line 27, "was" is changed to ---were---; col. 12, line 10, "Fig. 17" is changed to ---Fig. 14.---; col. 13, line 27, the symbols "$\pi 74$" are changed to ---$\pi\theta$---; col. 15, line 30, after "between" and before "plurality" ---a--- is inserted; col. 19, line 32, "one" is changed to ---on---; same col., line 36, ---?--- is added at the end of the sentence; col. 20, line 47, ---then--- is added after "$D_a$"; col. 21, line 62, "$n_1$" is changed to ---$N_1$---; col. 23, line 11, "rests" is changed to ---resets---; same col., line 24, "disolay" is changed to ---display---; col. 25, line 16, "paper" is changed to ---papers---; col. 26, line 67, before "detour", "for" is changed to ---to---; col. 28, line 40, "prepared" is changed to ---prepares---; col. 29, line 5, "whiceis" is changed to ---which is---; same col., line 55, after "$L_a$", there is added ---. This time the lead distance $D_a$ is not considered. If $D_1$ is less than $L_a$,---; same col., line 61, "raw" is changed to ---new---; col. 32, line 11, "both" is changed to ---bother---; col. 37, line 26, "operator" is changed to ---operators---; claim 1, col. 38, line 47, the clause "said..." is the same paragraph as element e.; claim 20, col. 43, line 9, "ther" is changed to ---the---; claim 26, col. 44, line 13, "said" (first occurrence) is deleted; claim 29, col. 45, line 16, "$d_2$" is changed to ---$D_2$---.

Signed and sealed this 18th day of February 1975.

(SEAL)
Attest:

RUTH C. MASON
Attesting Officer

C. MARSHALL DANN
Commissioner of Patents
and Trademarks